United States Patent
Yang

(10) Patent No.: US 9,453,779 B2
(45) Date of Patent: Sep. 27, 2016

(54) SEMI-OPENED HYDRODYNAMIC TESTING DEVICE HAVING REVERSE PUMPING RETURN UNIT

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 337 days.

(21) Appl. No.: 14/019,689

(22) Filed: Sep. 6, 2013

(65) Prior Publication Data
US 2015/0068284 A1 Mar. 12, 2015

(51) Int. Cl.
*G01M 10/00* (2006.01)
*G01M 9/02* (2006.01)
*G01M 9/04* (2006.01)

(52) U.S. Cl.
CPC .................... *G01M 10/00* (2013.01)

(58) Field of Classification Search
CPC ....................................... G01M 9/04
USPC ...................................... 73/37, 147
See application file for complete search history.

(56) References Cited

U.S. PATENT DOCUMENTS

| | | | | |
|---|---|---|---|---|
| 3,055,212 A * | 9/1962 | Mackey | .................. | G01M 9/02 73/147 |
| 3,866,466 A * | 2/1975 | Cotter | .................... | G01M 9/04 73/147 |
| 6,470,740 B2 * | 10/2002 | Li | ........................... | G01M 9/04 73/147 |
| 2009/0320582 A1* | 12/2009 | Milde | ..................... | G01M 9/06 73/147 |
| 2010/0132446 A1* | 6/2010 | Corder | .................. | G01M 9/062 73/147 |
| 2010/0175465 A1* | 7/2010 | Kato | ................. | G01M 17/0074 73/147 |
| 2012/0048953 A1* | 3/2012 | Wang | .................. | G01M 99/002 236/51 |

* cited by examiner

*Primary Examiner* — Robert Huber
*Assistant Examiner* — Anthony W Megna Fuentes
(74) *Attorney, Agent, or Firm* — Bacon & Thomas, PLLC

(57) ABSTRACT

The present invention is aimed to improve the conventional plane-opened hydrodynamic testing device, one or more than one reverse pumping return units (201) are installed with a parallel or substantially parallel manner at the periphery of an active fluid pumping unit (101), so a part of the fluid discharged from the outlet port of the active fluid pumping unit (101) is enabled to be sucked and reversely pumped for being returned to an adjacent space defined at the fluid inlet port of the active fluid pumping unit (101), thereby structuring a semi-opened hydrodynamic testing device having reverse pumping return unit.

21 Claims, 12 Drawing Sheets

FIG. 7
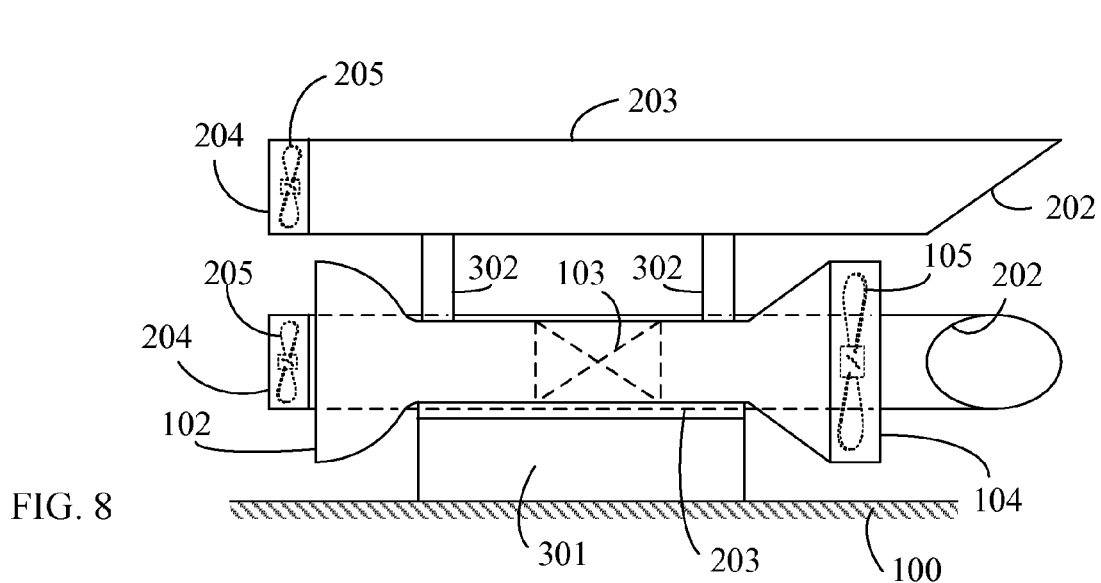
FIG. 8
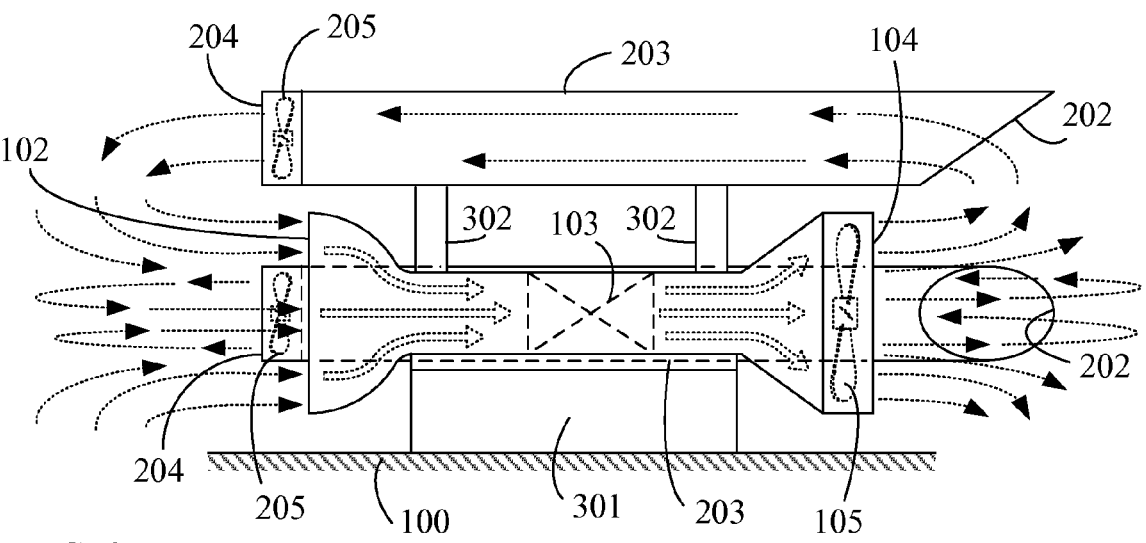
FIG. 9

SEMI-OPENED HYDRODYNAMIC TESTING DEVICE HAVING REVERSE PUMPING RETURN UNIT

BACKGROUND OF THE INVENTION (a) Field of the Invention

The present invention is aimed to improve the conventional plane-opened hydrodynamic testing device, one or more than one reverse pumping return units (201) are installed with a parallel or substantially parallel manner at the periphery of an active fluid pumping unit (101), so a part of the fluid discharged from the outlet port of the active fluid pumping unit (101) is enabled to be sucked and reversely pumped for being returned to an adjacent space defined at the fluid inlet port of the active fluid pumping unit (101), thereby structuring a semi-opened hydrodynamic testing device having reverse pumping return unit.

(b) Description of the Prior Art

A conventional hydrodynamic testing device includes a closed circulating hydrodynamic testing device or an opened hydrodynamic testing device for pumping airflow or liquid fluid, wherein the opened hydrodynamic testing device, e.g. an opened hydrodynamic testing device adopting airflow as the fluid member (as known as a wind tunnel) is usually formed in a tubular structure and installed with a negative pressure or positive pressure fluid pump for pumping the fluid, the fluid is sucked from a fluid inlet port of the opened hydrodynamic testing device and discharged from a fluid outlet port of the opened hydrodynamic testing device and a testing platform is installed at the middle segment of the pipeline, thus two ends of the opened hydrodynamic testing device are required to respectively reserve a negative pressure space for sucking fluid and a positive pressure space for the fluid discharging stroke.

SUMMARY OF THE INVENTION

A conventional hydrodynamic testing device includes a closed circulating hydrodynamic testing device or an opened hydrodynamic testing device for pumping airflow or liquid fluid, wherein the opened hydrodynamic testing device, e.g. an opened hydrodynamic testing device adopting airflow as the fluid member (as known as a wind tunnel) is usually formed in a tubular structure and installed with a negative pressure or positive pressure fluid pump for pumping the fluid, the fluid is sucked from a fluid inlet port of the opened hydrodynamic testing device and discharged from a fluid outlet port of the opened hydrodynamic testing device and a testing platform is installed at the middle segment of the pipeline, thus two ends of the opened hydrodynamic testing device are required to respectively reserve a negative pressure space for sucking fluid and a positive pressure space for the fluid discharging stroke;

The present invention is to provide a semi-opened hydrodynamic testing device having reverse pumping return unit, the characteristic is that one or more than one reverse pumping return units (201) are installed with a parallel or substantially parallel manner at the periphery of one or more than one active fluid pumping units (101), and the fluid inlet port (202) of the reverse pumping return unit (201) is installed at a space close to the fluid outlet port (104) of the active fluid pumping unit (101); with the negative pressure provided by the fluid inlet port (202) of the reverse pumping return unit (201), a part of the fluid discharged from the fluid outlet port (104) of the active fluid pumping unit (101) is enabled to be transported to a space defined at where the fluid inlet port (102) of the active fluid pumping unit (101) sucking the fluid, or discharged towards a direction different from the outward radiating direction with the fluid discharging direction of the active fluid pumping unit (101) being served as the axial core thereby structuring the semi-opened hydrodynamic testing device having reverse pumping return unit, so the discharging resistance at the fluid outlet port (104) of the active fluid pumping unit (101) and the required discharging stroke space can be reduced.

BRIEF DESCRIPTION OF THE DRAWINGS

FIG. 7 is the second schematic structural view of the embodiment illustrating one active fluid pumping unit (101) and two reverse pumping return units (201) being adopted according to the present invention.

FIG. 8 is a side view of FIG. 7.

FIG. 9 is a schematic view illustrating the operational status of FIG. 7 and FIG. 8.

DESCRIPTION OF MAIN COMPONENT SYMBOLS

Figure 1:
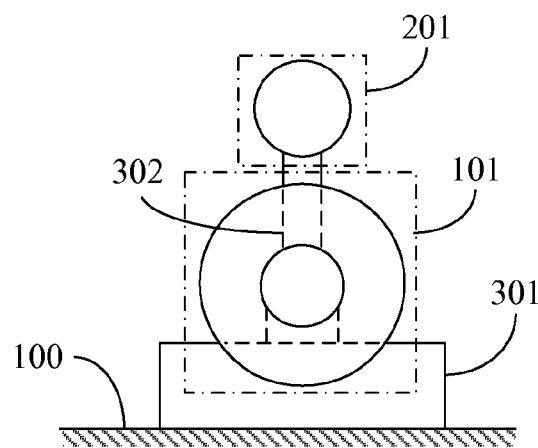
FIG. 1 is a schematic view showing the main structure of the present invention.

100: Carrying surface
101: Active fluid pumping unit
102: Fluid inlet port
103: Testing segment
104: Fluid outlet port
105: Fluid pump
201: Reverse pumping return unit
202: Fluid inlet port
203: Middle transporting pipeline segment
204: Fluid outlet port
205: Return fluid pump
301: Base seat
302: Combination structure
400: Annular flow guiding mask
500: Flow guiding cover
600: In/out door

DETAILED DESCRIPTION OF THE PREFERRED EMBODIMENTS

A conventional hydrodynamic testing device includes a closed circulating hydrodynamic testing device or an opened hydrodynamic testing device for pumping airflow or liquid fluid, wherein the opened hydrodynamic testing device, e.g. an opened hydrodynamic testing device adopting airflow as the fluid member (as known as a wind tunnel) is usually formed in a tubular structure and installed with a negative pressure or positive pressure fluid pump for pumping the fluid, the fluid is sucked from a fluid inlet port of the opened hydrodynamic testing device and discharged from a fluid outlet port of the opened hydrodynamic testing device and a testing platform is installed at the middle segment of the pipeline, thus two ends of the opened hydrodynamic testing device are required to respectively reserve a negative pressure space for sucking fluid and a positive pressure space for the fluid discharging stroke.

The present invention is aimed to improve the conventional plane-opened hydrodynamic testing device, one or more than one reverse pumping return units (201) are installed with a parallel or substantially parallel manner at the periphery of an active fluid pumping unit (101), so a part of the fluid discharged from the outlet port of the active fluid pumping unit (101) is enabled to be sucked and reversely pumped for being returned to an adjacent space defined at the fluid inlet port of the active fluid pumping unit (101), thereby structuring a semi-opened hydrodynamic testing device having reverse pumping return unit.

The present invention is to provide a semi-opened hydrodynamic testing device having reverse pumping return unit, the characteristic is that one or more than one reverse pumping return units (201) are installed with a parallel or substantially parallel manner at the periphery of one or more than one active fluid pumping units (101), and the fluid inlet port (202) of the reverse pumping return unit (201) is installed at a space close to the fluid outlet port (104) of the active fluid pumping unit (101).

Figure 2:
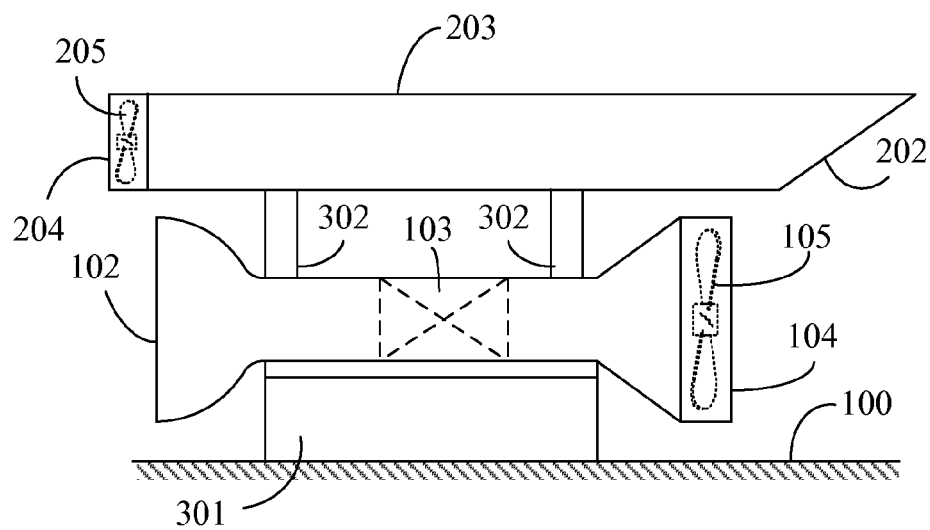
FIG. 2 is a side view of FIG. 1.
Figure 3:
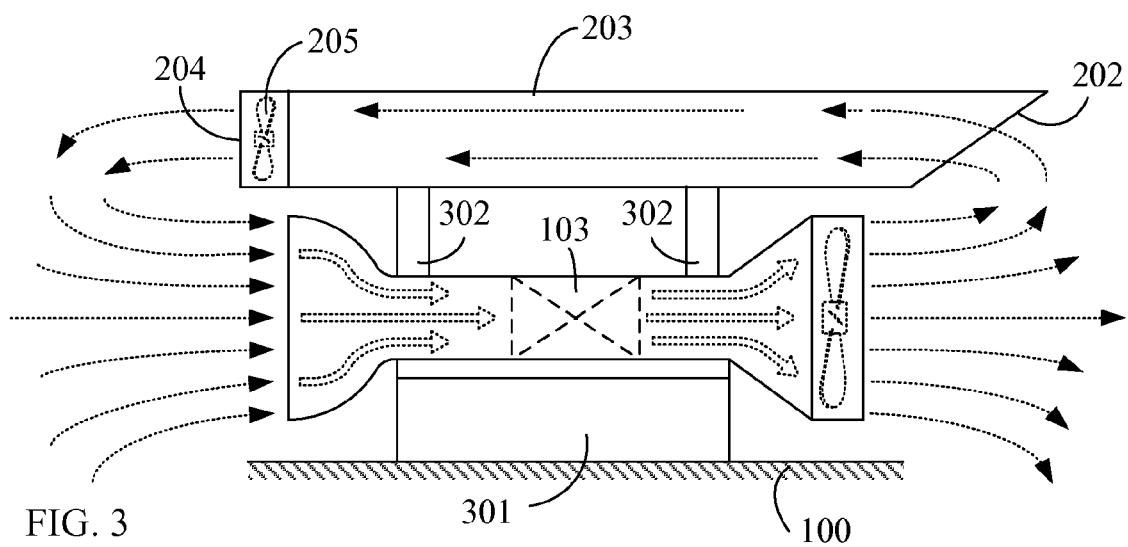
FIG. 3 is a schematic view illustrating the operational status of FIG. 1 and FIG. 2.

The various applicable structures and operational status of the semi-opened hydrodynamic testing device having reverse pumping return unit are illustrated as followings:

FIG. 1 is a schematic view showing the main structure of the present invention;

FIG. 2 is a side view of FIG. 1;

According to the semi-opened hydrodynamic testing device having reverse pumping return unit, one or more than one of the reverse pumping return units (201) are installed with a parallel or substantially parallel manner at the periphery of the active fluid pumping unit (101), which mainly consists:

Active fluid pumping unit (101): composed of a retracting pipeline segment, a middle testing segment (103), an expanding pipeline segment and a fluid pump (105) installed at the expanding pipeline segment so as to be jointly installed on a base seat (301); with the pumping pressure provided by the fluid pump (105), the fluid inlet port (102) of the retracting pipeline segment is enabled to suck the fluid, the fluid outlet port (104) of the expanding pipeline segment is served to discharge the fluid to the exterior, and the testing segment (103) is served to be installed with a testing member;

Reverse pumping return unit (201): composed of a fluid inlet port (202) of a fluid collecting pipeline segment for sucking fluid, a middle transporting pipeline segment (203) for transporting fluid, a discharging pipeline segment for discharging fluid and a fluid outlet port (204), and a return fluid pump (205) is installed at the fluid outlet port (204) of the reverse pumping return unit (201) or at a location close to the outlet port, and jointly fastened at the periphery of the tubular body of the active fluid pumping unit (101) and/or fastened on the base seat (301) through a combination structure (302), the fluid discharged from the fluid outlet port (104) of the active fluid pumping unit (101) is enabled to be sucked through the pumping of the return fluid pump (205), and a part thereof is transported to an area close to where the fluid inlet port (102) of the active fluid pumping unit (101) sucking fluid;

Return fluid pump (205): composed of an airflow or liquid fluid pump driven by an electric motor;

Base seat (301): installed on a carrying surface (100) such as a ground or a construction unit for carrying the active fluid pumping unit (101), the reverse pumping return unit (201) and other relevant structural members by which the semi-opened hydrodynamic testing device having reverse pumping return unit is configured;

With the negative pressure provided by the fluid inlet port (202) of the reverse pumping return unit (201), a part of the fluid discharged from the fluid outlet port (104) of the active fluid pumping unit (101) is enabled to be transported to a space close to where the fluid inlet port (102) of the active fluid pumping unit (101) sucking the fluid, or discharged towards different outward radiating directions with the fluid discharging direction of the active fluid pumping unit (101) being served as the axial core, thereby structuring the semi-opened hydrodynamic testing device having reverse pumping return unit, so the discharging resistance at the fluid outlet port (104) of the active fluid pumping unit (101) and the required discharging stroke space can be reduced;

FIG. 3 is a schematic view illustrating the operational status of FIG. 1 and FIG. 2, wherein arrows shown in FIG. 3 indicating the flowing direction of the fluid.

Figure 4:
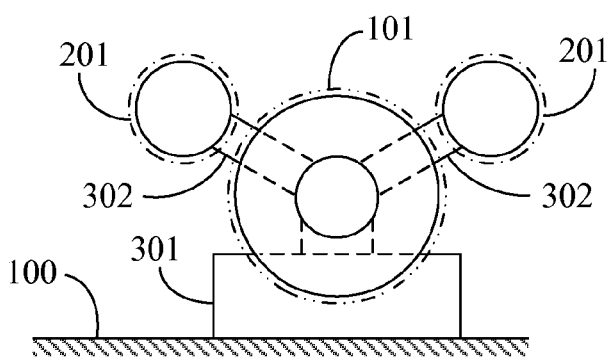
FIG. 4 is the first schematic structural view of the embodiment illustrating one active fluid pumping unit (101) and two reverse pumping return units (201) being adopted according to the present invention.
Figure 5:
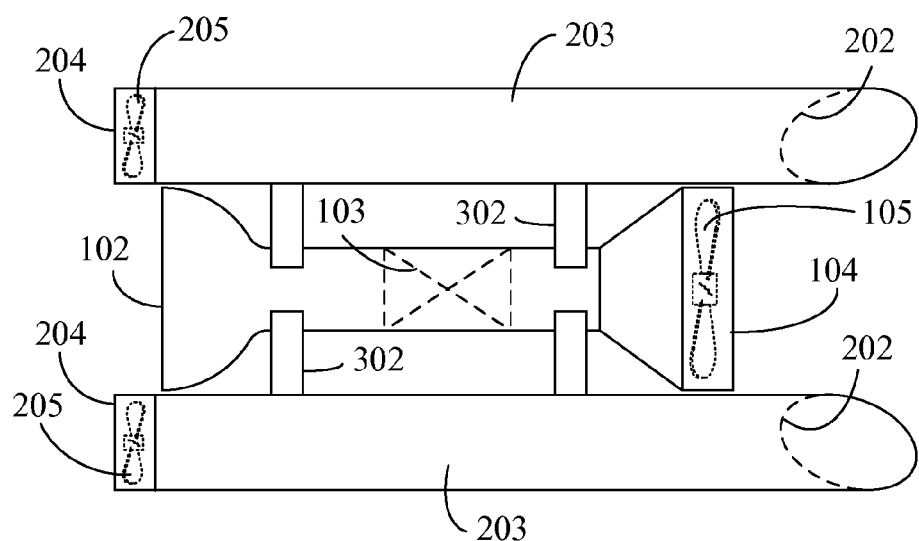
FIG. 5 is a top view of FIG. 4.
Figure 6:
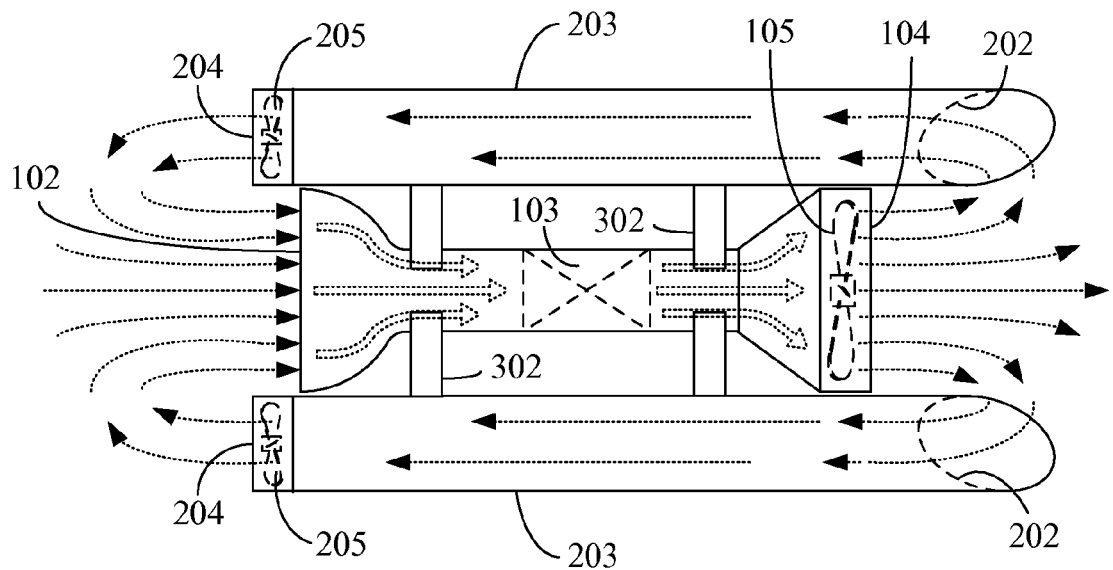
FIG. 6 is a schematic view illustrating the operational status of FIG. 4 and FIG. 5.

According to the semi-opened hydrodynamic testing device having reverse pumping return unit, one or more than one of the active fluid pumping units (101) and one or more than one of the reverse pumping return units (201) can be installed, embodiments provided are served for illustrations and shall not be the limitation to the scope of the present invention; a semi-opened hydrodynamic testing device having reverse pumping return unit adopting one active fluid pumping unit (101) and two reverse pumping return units (201) is provided for illustration, an embodiment thereof includes:

FIG. 4 is the first schematic structural view of the embodiment illustrating one active fluid pumping unit (101) and two reverse pumping return units (201) being adopted according to the present invention;

FIG. 5 is a top view of FIG. 4;

As shown in FIG. 4 and FIG. 5, mainly consists:

Active fluid pumping unit (101): composed of a retracting pipeline segment, a middle testing segment (103), an expanding pipeline segment and a fluid pump (105) installed at the expanding pipeline segment so as to be jointly installed on a base seat (301); with the pumping pressure provided by the fluid pump (105), the fluid inlet port (102) of the retracting pipeline segment is enabled to suck the fluid, the fluid outlet port (104) of the expanding pipeline segment is served to discharge the fluid to the exterior, and the testing segment (103) is served to be installed with a testing member;

Reverse pumping return unit (201): composed of two parallel or substantially parallel reverse pumping return units (201) installed at the periphery of the active fluid pumping unit (101) in a radial manner, each of the reverse pumping return units (201) includes a fluid inlet port (202) of a fluid collecting pipeline segment for sucking fluid, a middle transporting pipeline segment (203) for transporting fluid, a discharging pipeline segment for discharging fluid and a fluid outlet port (204), and a return fluid pump (205) is installed at the fluid outlet port (204) of the reverse pumping return unit (201) or at a location close to the outlet port, the two reverse pumping return units (201) and the active fluid pumping unit (101) are jointly fastened with a reverse-triangle format at the periphery of the tubular body of the active fluid pumping unit (101) and/or fastened on the base seat (301) through a combination structure (302), the fluid discharged from the fluid outlet port (104) of the active fluid pumping unit (101) is enabled to be sucked through the pumping of the return fluid pump (205), and a part thereof is transported to an area close to where the fluid inlet port (102) of the active fluid pumping unit (101) sucking fluid;

Return fluid pump (205): composed of an airflow or liquid fluid pump driven by an electric motor;

Base seat (301): installed on a carrying surface (100) such as a ground or a construction unit for carrying the active fluid pumping unit (101), the reverse pumping return unit (201) and other relevant structural members by which the semi-opened hydrodynamic testing device having reverse pumping return unit is configured;

FIG. 6 is a schematic view illustrating the operational status of FIG. 4 and FIG. 5, wherein arrows shown in FIG. 6 indicating the flowing direction of the fluid.

The mentioned semi-opened hydrodynamic testing device having reverse pumping return unit installed with one active fluid pumping unit (101) and two reverse pumping return units (201) can be further shown as FIG. 7 and FIG. 8, wherein one of the reverse pumping return units (201) is installed at the top of the active fluid pumping unit (101), and the other reverse pumping return unit (201) is installed at a horizontal side of the active fluid pumping unit (101);

FIG. 7 is the second schematic structural view of the embodiment illustrating one active fluid pumping unit (101) and two reverse pumping return units (201) being adopted according to the present invention;

FIG. 8 is a side view of FIG. 7;

As shown in FIG. 7 and FIG. 8, mainly consists:

Active fluid pumping unit (101): composed of a retracting pipeline segment, a middle testing segment (103), an expanding pipeline segment and a fluid pump (105) installed at the expanding pipeline segment so as to be jointly installed on a base seat (301); with the pumping pressure provided by the fluid pump (105), the fluid inlet port (102) of the retracting pipeline segment is enabled to suck the fluid, the fluid outlet port (104) of the expanding pipeline segment is served to discharge the fluid to the exterior, and the testing segment (103) is served to be installed with a testing member;

Reverse pumping return unit (201): composed of two parallel or substantially parallel reverse pumping return units (201) installed at the periphery of the active fluid pumping unit (101) in a radial manner, each of the reverse pumping return units (201) includes a fluid inlet port (202) of a fluid collecting pipeline segment for sucking fluid, a middle transporting pipeline segment (203) for transporting fluid, a discharging pipeline segment for discharging fluid and a fluid outlet port (204), and a return fluid pump (205) is installed at the fluid outlet port (204) of the reverse pumping return unit (201) or at a location close to the outlet port, one of the reverse pumping return units (201) is installed at the top of the active fluid pumping unit (101), the other reverse pumping return unit (201) is installed at a horizontal side of the active fluid pumping unit (101), and jointly fastened at the periphery of the tubular body of the active fluid pumping unit (101) and/or fastened on the base seat (301) through a combination structure (302), the fluid discharged from the fluid outlet port (104) of the active fluid pumping unit (101) is enabled to be sucked through the pumping of the return fluid pump (205), and a part thereof is transported to an area close to where the fluid inlet port (102) of the active fluid pumping unit (101) sucking fluid;

Return fluid pump (205): composed of an airflow or liquid fluid pump driven by an electric motor;

Base seat (301): installed on a carrying surface (100) such as a ground or a construction unit for carrying the active fluid pumping unit (101), the reverse pumping return unit (201) and other relevant structural members by which the semi-opened hydrodynamic testing device having reverse pumping return unit is configured;

FIG. 9 is a schematic view illustrating the operational status of FIG. 7 and FIG. 8, wherein arrows shown in FIG. 9 indicating the flowing direction of the fluid.

Figure 10:
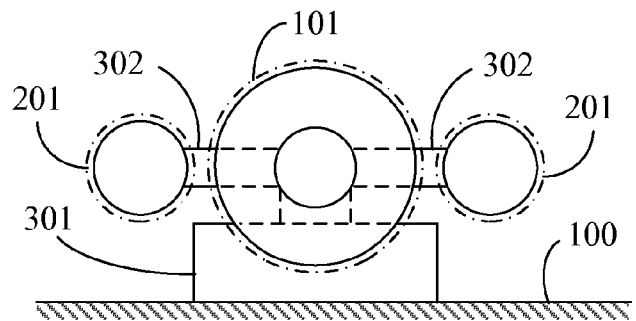
FIG. 10 is the third schematic structural view of the embodiment illustrating one active fluid pumping unit (101) and two reverse pumping return units (201) being adopted according to the present invention.
Figure 11:
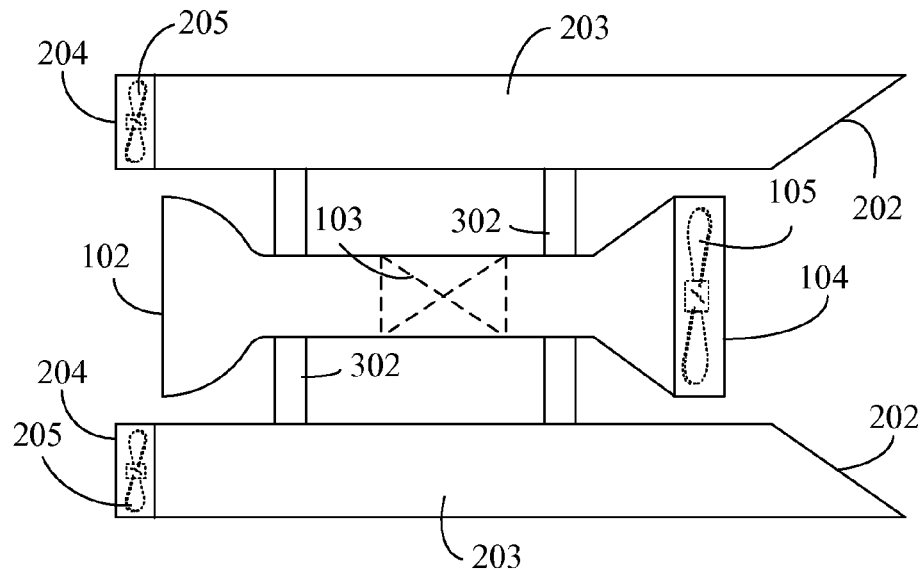
FIG. 11 is a top view of FIG. 10.
Figure 12:
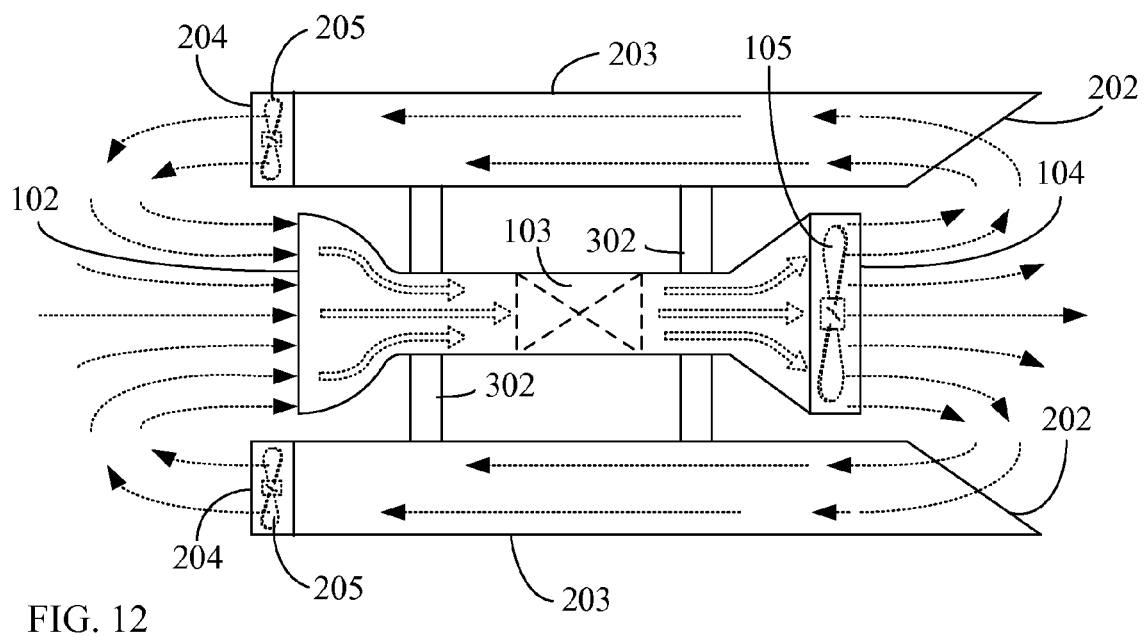
FIG. 12 is a schematic view illustrating the operational status of FIG. 10 and FIG. 11.

The mentioned semi-opened hydrodynamic testing device having reverse pumping return unit installed with one active fluid pumping unit (101) and two reverse pumping return units (201) can be further shown as FIG. 10 and FIG. 11, wherein two reverse pumping return units (201) are installed at two horizontal sides of the active fluid pumping unit (101);

FIG. 10 is the third schematic structural view of the embodiment illustrating one active fluid pumping unit (101) and two reverse pumping return units (201) being adopted according to the present invention;

FIG. 11 is a top view of FIG. 10;

As shown in FIG. 10 and FIG. 11, mainly consists:

Active fluid pumping unit (101): composed of a retracting pipeline segment, a middle testing segment (103), an expanding pipeline segment and a fluid pump (105) installed at the expanding pipeline segment so as to be jointly installed on a base seat (301); with the pumping pressure provided by the fluid pump (105), the fluid inlet port (102) of the retracting pipeline segment is enabled to suck the fluid, the fluid outlet port (104) of the expanding pipeline segment is served to discharge the fluid to the exterior, and the testing segment (103) is served to be installed with a testing member;

Reverse pumping return unit (201): composed of two parallel or substantially parallel reverse pumping return units (201) installed at the periphery of the active fluid pumping unit (101) in a radial manner, each of the reverse pumping return units (201) includes a fluid inlet port (202) of a fluid collecting pipeline segment for sucking fluid, a middle transporting pipeline segment (203) for transporting fluid, a discharging pipeline segment for discharging fluid and a fluid outlet port (204), and a return fluid pump (205) is installed at the fluid outlet port (204) of the reverse pumping return unit (201) or at a location close to the outlet port, and the two reverse pumping return units (201) are installed at two horizontal sides of the active fluid pumping unit (101) and jointly fastened at the periphery of the tubular body of the active fluid pumping unit (101) and/or fastened on the base seat (301) through a combination structure (302), the fluid discharged from the fluid outlet port (104) of the active fluid pumping unit (101) is enabled to be sucked through the pumping of the return fluid pump (205), and a part thereof is transported to an area close to where the fluid inlet port (102) of the active fluid pumping unit (101) sucking fluid;

Return fluid pump (205): composed of an airflow or liquid fluid pump driven by an electric motor;

Base seat (301): installed on a carrying surface (100) such as a ground or a construction unit for carrying the active fluid pumping unit (101), the reverse pumping return unit (201) and other relevant structural members by which the semi-opened hydrodynamic testing device having reverse pumping return unit is configured;

FIG. 12 is a schematic view illustrating the operational status of FIG. 10 and FIG. 11, wherein arrows shown in FIG. 12 indicating the flowing direction of the fluid.

Figure 13:
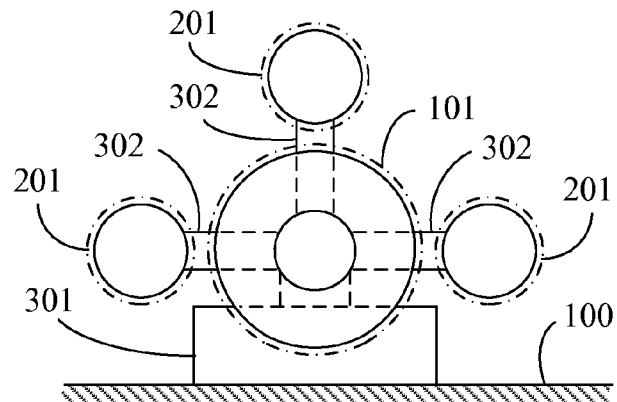
FIG. 13 is the first schematic structural view of the embodiment illustrating one active fluid pumping unit (101) and three reverse pumping return units (201) being adopted according to the present invention.
Figure 14:
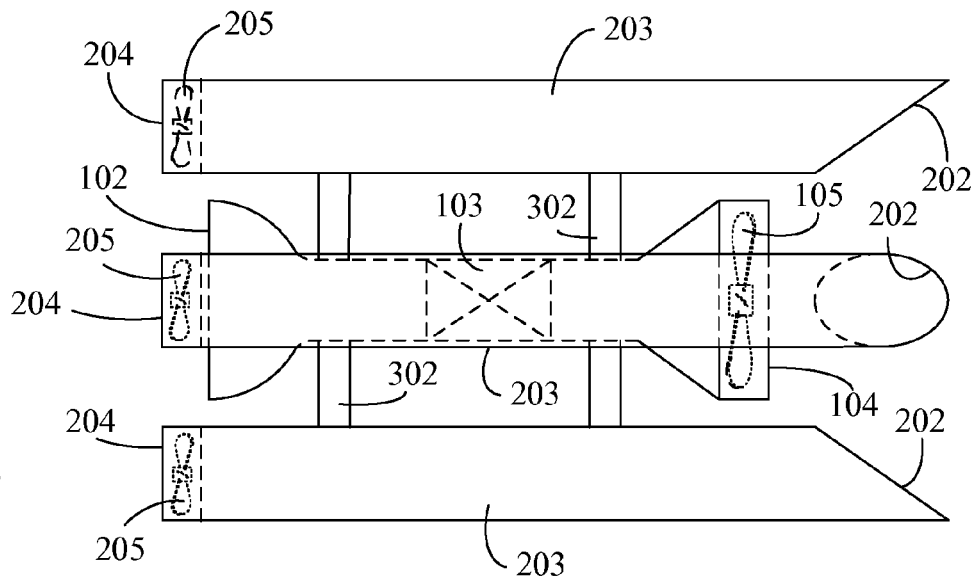
FIG. 14 is a top view of FIG. 13.
Figure 15:
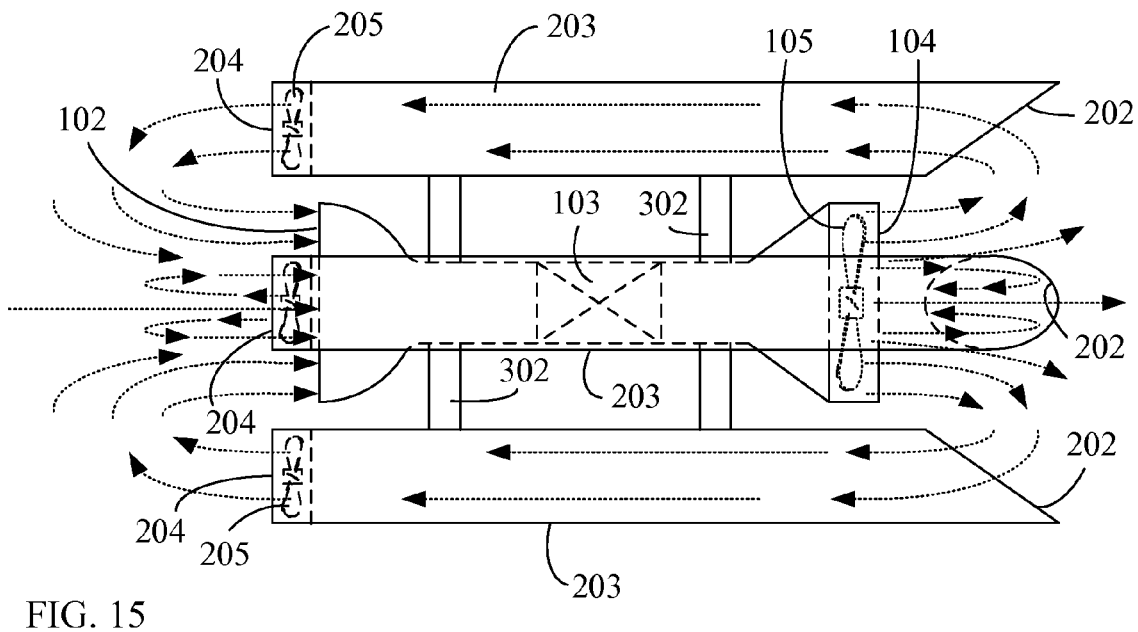
FIG. 15 is a schematic view illustrating the operational status of FIG. 13 and FIG. 14.

According to the semi-opened hydrodynamic testing device having reverse pumping return unit, it can further adopt one active fluid pumping unit (101) and three reverse pumping return units (201);

According to the semi-opened hydrodynamic testing device having reverse pumping return unit, three reverse pumping return units (201) are installed with a parallel or substantially parallel manner at the periphery of the active fluid pumping unit (101);

FIG. 13 is the first schematic structural view of the embodiment illustrating one active fluid pumping unit (101) and three reverse pumping return units (201) being adopted according to the present invention;

FIG. 14 is a top view of FIG. 13;

As shown in FIG. 13 and FIG. 14, mainly consists:

Active fluid pumping unit (101): composed of a retracting pipeline segment, a middle testing segment (103), an expanding pipeline segment and a fluid pump (105) installed at the expanding pipeline segment so as to be jointly installed on a base seat (301); with the pumping pressure provided by the fluid pump (105), the fluid inlet port (102) of the retracting pipeline segment is enabled to suck the fluid, the fluid outlet port (104) of the expanding pipeline segment is served to discharge the fluid to the exterior, and the testing segment (103) is served to be installed with a testing member;

Reverse pumping return unit (201): composed of three parallel or substantially parallel reverse pumping return units (201) installed at the periphery of the active fluid pumping unit (101) in a radial manner, each of the reverse pumping return units (201) includes a fluid inlet port (202) of a fluid collecting pipeline segment for sucking fluid, a middle transporting pipeline segment (203) for transporting fluid, a discharging pipeline segment for discharging fluid and a fluid outlet port (204), and a return fluid pump (205) is installed at the fluid outlet port (204) of the reverse pumping return unit (201) or at a location close to the outlet port, and one of the three reverse pumping return units (201) is installed at the top of the active fluid pumping unit (101), the other two reverse pumping return units (201) are installed at two sides of the active fluid pumping unit (101), and the three jointly fastened at the periphery of the tubular body of the active fluid pumping unit (101) and/or fastened on the base seat (301) through a combination structure (302), the fluid discharged from the fluid outlet port (104) of the active fluid pumping unit (101) is enabled to be sucked through the pumping of the return fluid pump (205), and a part thereof is transported to an area close to where the fluid inlet port (102) of the active fluid pumping unit (101) sucking fluid;

Return fluid pump (205): composed of an airflow or liquid fluid pump driven by an electric motor;

Base seat (301): installed on a carrying surface (100) such as a ground or a construction unit for carrying the active fluid pumping unit (101), the reverse pumping return unit (201) and other relevant structural members by which the semi-opened hydrodynamic testing device having reverse pumping return unit is configured;

FIG. 15 is a schematic view illustrating the operational status of FIG. 13 and FIG. 14, wherein arrows shown in FIG. 15 indicating the flowing direction of the fluid.

Figure 16:
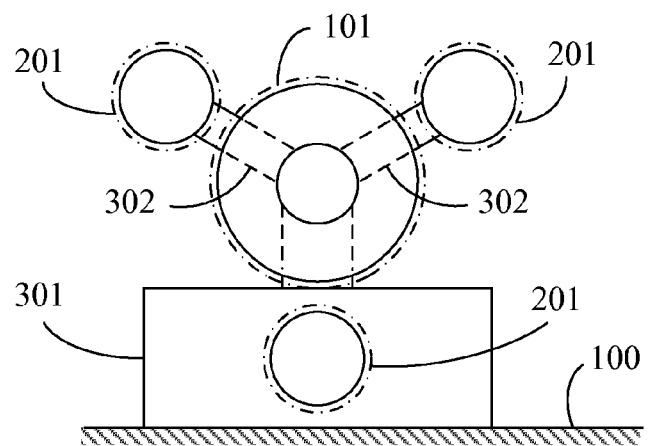
FIG. 16 is the second schematic structural view of the embodiment illustrating one active fluid pumping unit (101) and three reverse pumping return units (201) being adopted according to the present invention.
Figure 17:
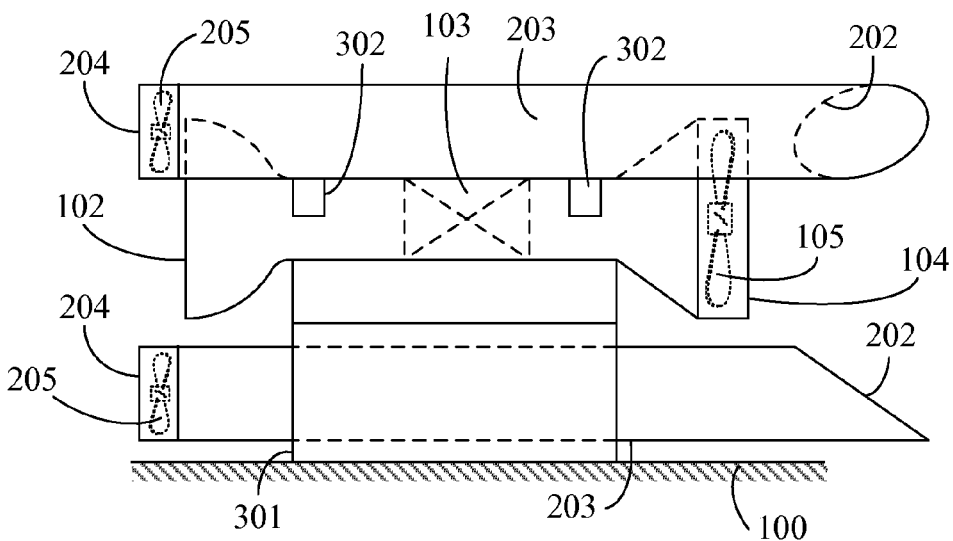
FIG. 17 is a side view of FIG. 16.
Figure 18:
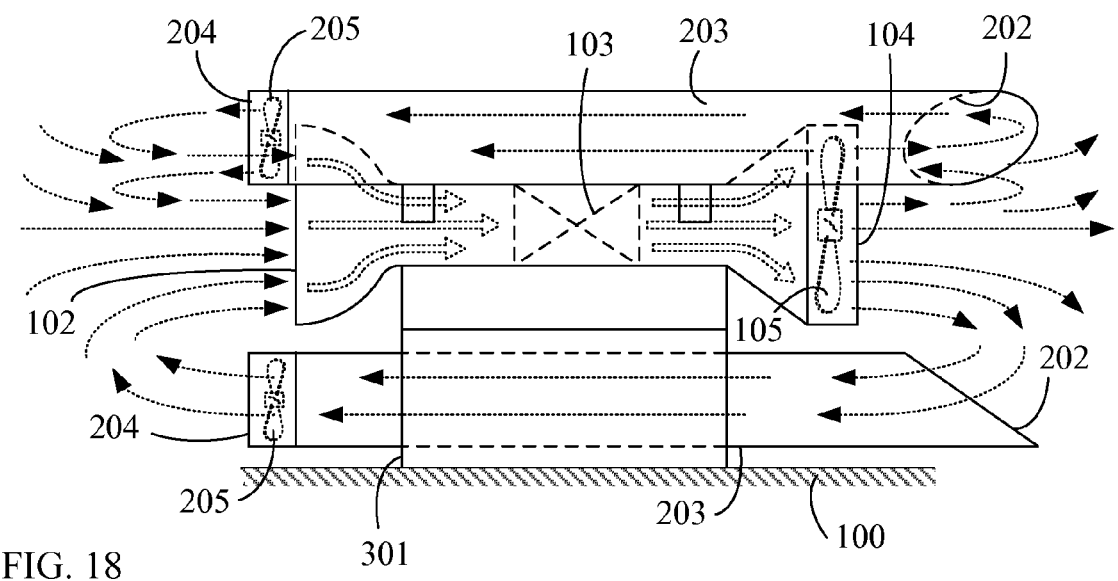
FIG. 18 is a schematic view illustrating the operational status of FIG. 16 and FIG. 17.

The mentioned semi-opened hydrodynamic testing device having reverse pumping return unit installed with one active fluid pumping unit (101) and three reverse pumping return units (201) can be further shown as FIG. 16 and FIG. 17, wherein one of the three reverse pumping return units (201) is installed on the base seat (301) with a transversally penetrating manner, and the other two reverse pumping return units (201) are installed at two sides of the active fluid pumping unit (101);

FIG. 16 is the second schematic structural view of the embodiment illustrating one active fluid pumping unit (101) and three reverse pumping return units (201) being adopted according to the present invention;

FIG. 17 is a side view of FIG. 16;

As shown in FIG. 16 and FIG. 17, mainly consists:

Active fluid pumping unit (101): composed of a retracting pipeline segment, a middle testing segment (103), an expanding pipeline segment and a fluid pump (105) installed at the expanding pipeline segment so as to be jointly installed on a base seat (301); with the pumping pressure provided by the fluid pump (105), the fluid inlet port (102) of the retracting pipeline segment is enabled to suck the fluid, the fluid outlet port (104) of the expanding pipeline segment is served to discharge the fluid to the exterior, and the testing segment (103) is served to be installed with a testing member;

Reverse pumping return unit (201): composed of three parallel or substantially parallel reverse pumping return units (201) installed at the periphery of the active fluid pumping unit (101) in a radial manner, each of the reverse pumping return units (201) includes a fluid inlet port (202) of a fluid collecting pipeline segment for sucking fluid, a middle transporting pipeline segment (203) for transporting fluid, a discharging pipeline segment for discharging fluid and a fluid outlet port (204), and a return fluid pump (205) is respectively installed at the fluid outlet port (204) of the reverse pumping return unit (201) or at a location close to the outlet port, and one of the three reverse pumping return units (201) is installed on the base seat (301) with a transversally penetrating manner, the other two reverse pumping return units (201) and the active fluid pumping unit (101) are jointly fastened with a reverse-triangle format at the periphery of the tubular body of the active fluid pumping unit (101) and/or fastened on the base seat (301) through a combination structure (302); the fluid discharged from the fluid outlet port (104) of the active fluid pumping unit (101) is enabled to be sucked through the pumping of the return fluid pump (205), and a part thereof is transported to an area close to where the fluid inlet port (102) of the active fluid pumping unit (101) sucking fluid;

Return fluid pump (205): composed of an airflow or liquid fluid pump driven by an electric motor;

Base seat (301): installed on a carrying surface (100) such as a ground or a construction unit for carrying the active fluid pumping unit (101), the reverse pumping return unit (201) and other relevant structural members by which the semi-opened hydrodynamic testing device having reverse pumping return unit is configured;

FIG. 18 is a schematic view illustrating the operational status of FIG. 16 and FIG. 17, wherein arrows shown in FIG. 18 indicating the flowing direction of the fluid.

Figure 19:
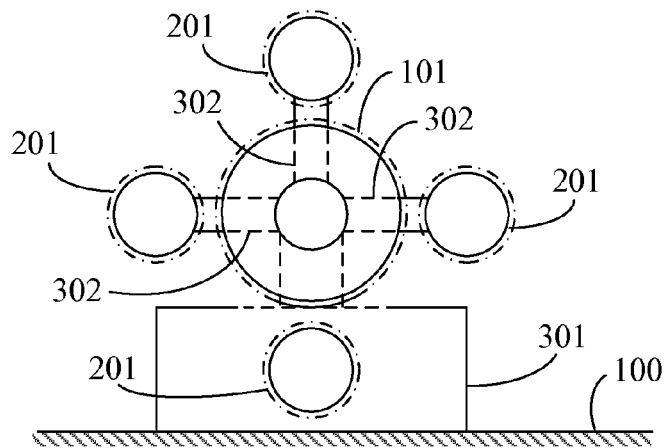
FIG. 19 is a schematic structural view of an embodiment illustrating one active fluid pumping unit (101) and four reverse pumping return units (201) being adopted according to the present invention.
Figure 20:
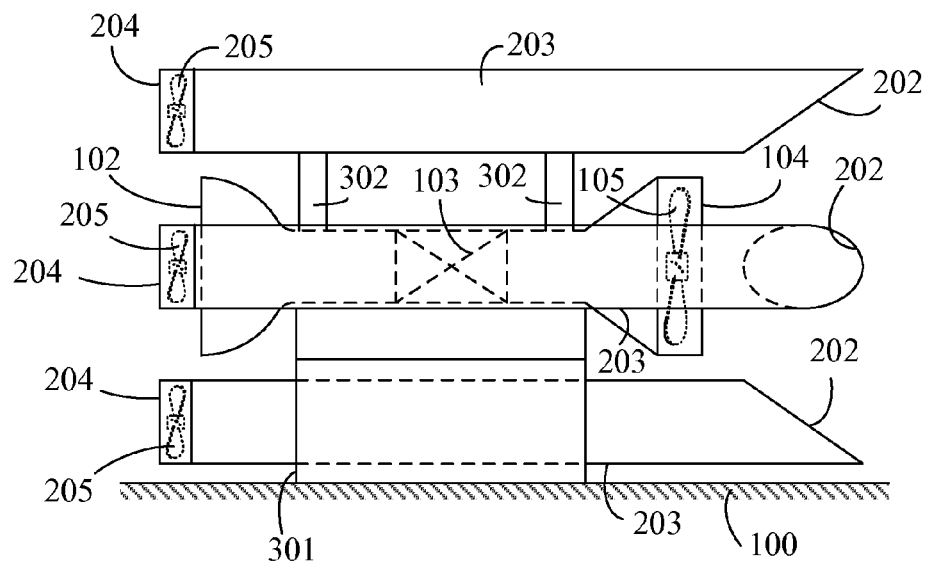
FIG. 20 is a side view of FIG. 19.
Figure 21:
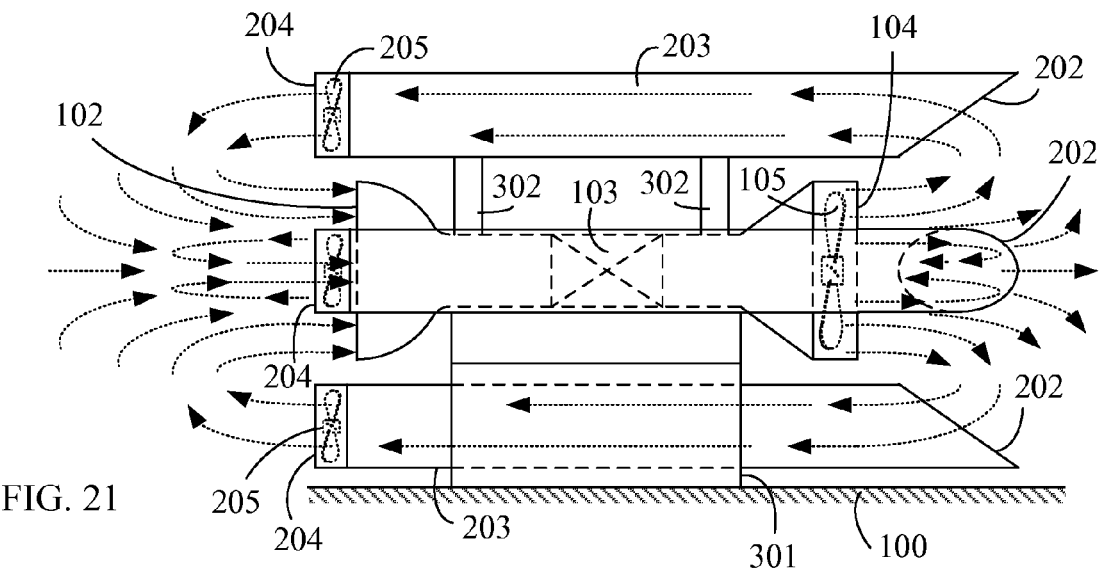
FIG. 21 is a schematic view illustrating the operational status of FIG. 19 and FIG. 20.

According to the semi-opened hydrodynamic testing device having reverse pumping return unit, one active fluid pumping unit (101) and four reverse pumping return units (201) can be further adopted; FIG. 19 is a schematic structural view of an embodiment illustrating one active fluid pumping unit (101) and four reverse pumping return units (201) being adopted according to the present invention;

FIG. 20 is a side view of FIG. 19;

As shown in FIG. 19 and FIG. 20, mainly consists:

Active fluid pumping unit (101): composed of a retracting pipeline segment, a middle testing segment (103), an expanding pipeline segment and a fluid pump (105) installed at the expanding pipeline segment so as to be jointly installed on a base seat (301); with the pumping pressure provided by the fluid pump (105), the fluid inlet port (102) of the retracting pipeline segment is enabled to suck the fluid, the fluid outlet port (104) of the expanding pipeline segment is served to discharge the fluid to the exterior, and the testing segment (103) is served to be installed with a testing member;

Reverse pumping return unit (201): composed of four parallel or substantially parallel reverse pumping return units (201) installed at the periphery of the active fluid pumping unit (101) in a radial manner, each of the reverse pumping return units (201) includes a fluid inlet port (202) of a fluid collecting pipeline segment for sucking fluid, a middle transporting pipeline segment (203) for transporting fluid, a discharging pipeline segment for discharging fluid and a fluid outlet port (204), and a return fluid pump (205) is respectively installed at the fluid outlet port (204) of the reverse pumping return unit (201) or at a location close to the outlet port, and the four reverse pumping return units (201) are jointly fastened at the periphery of the tubular body of the active fluid pumping unit (101) and/or fastened on the base seat (301) through a combination structure (302), the fluid discharged from the fluid outlet port (104) of the active fluid pumping unit (101) is enabled to be sucked through the pumping of the respectively-installed return fluid pump (205), and a part thereof is transported to an area close to where the fluid inlet port (102) of the active fluid pumping unit (101) sucking fluid;

Return fluid pump (205): composed of an airflow or liquid fluid pump driven by an electric motor;

Base seat (301): installed on a carrying surface (100) such as a ground or a construction unit for carrying the active fluid pumping unit (101), the reverse pumping return unit (201) and other relevant structural members by which the semi-opened hydrodynamic testing device having reverse pumping return unit is configured;

FIG. 21 is a schematic view illustrating the operational status of FIG. 19 and FIG. 20, wherein arrows shown in FIG. 21 indicating the flowing direction of the fluid.

Figure 22:
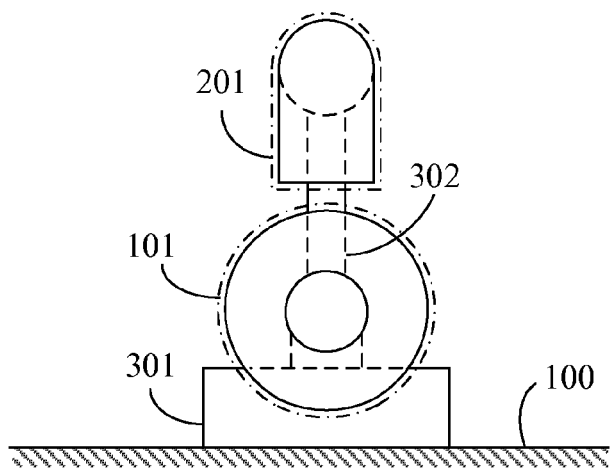
FIG. 22 is a schematic structural view illustrating the fluid inlet port (202) and/or the fluid outlet port (204) of the reverse pumping return unit (201) being arranged in a downward introducing structure relative to the fluid inlet and/or the fluid outlet port of the active fluid pumping unit (101) according to one embodiment of the present invention.
Figure 23:
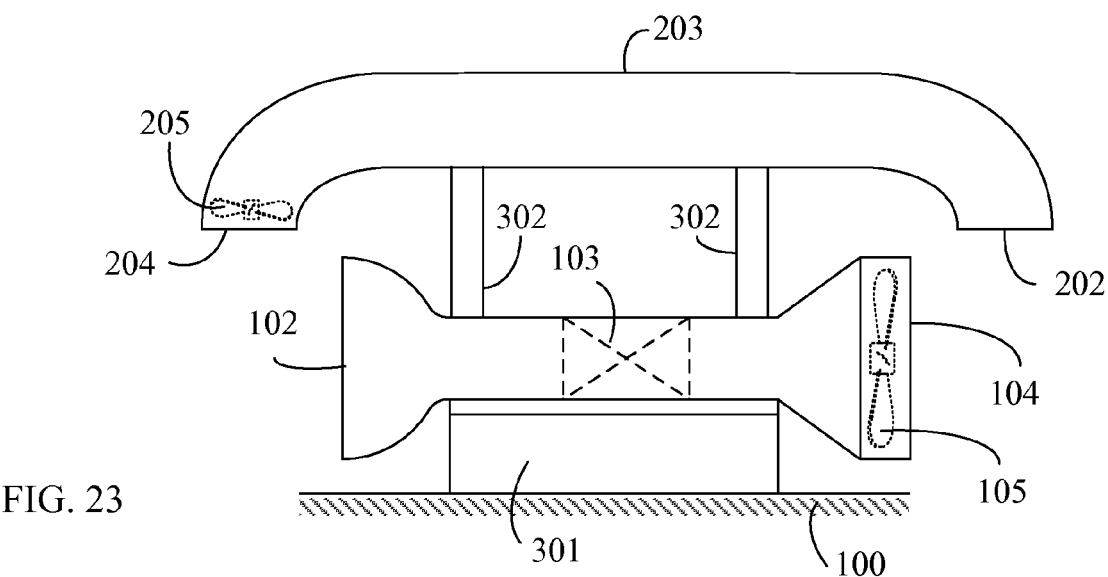
FIG. 23 is a side view of FIG. 22.
Figure 24:
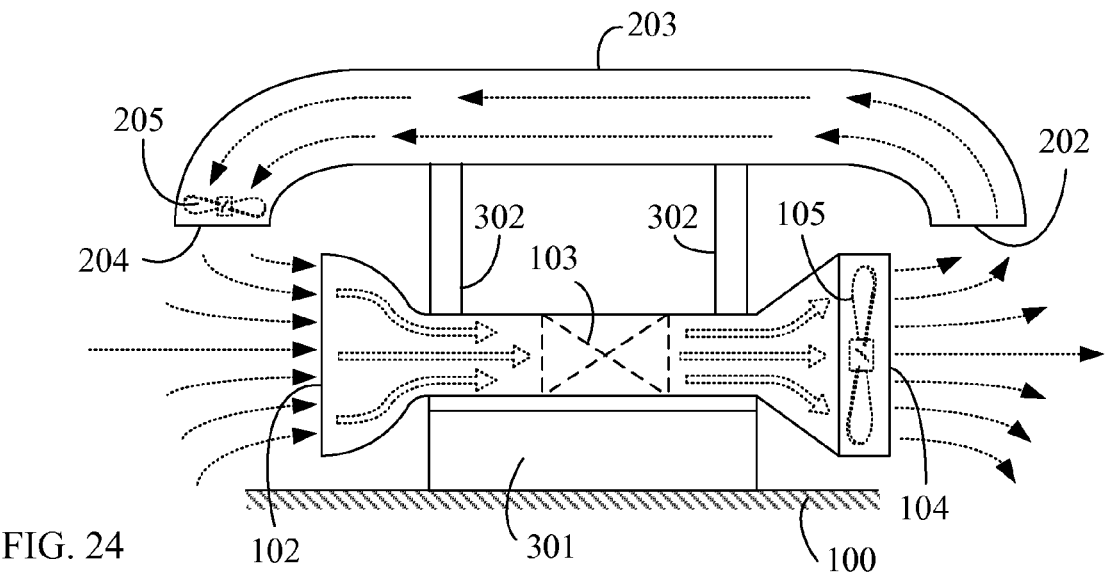
FIG. 24 is a schematic view illustrating the operational status of FIG. 22 and FIG. 23.

According to the semi-opened hydrodynamic testing device having reverse pumping return unit, the fluid inlet port (202) and/or the fluid outlet port (204) of the reverse pumping return unit (201) can be designed as a downward introducing structure relative to the fluid inlet and/or the fluid outlet port of the active fluid pumping unit (101) for enhancing the reverse returning performance, and the configuration is that one or more than one of the fluid inlet ports (202) and/or fluid outlet ports (204) in a downward introducing structure relative to the fluid inlet and/or the fluid outlet port of the active fluid pumping unit (101) are installed with a parallel or substantially parallel manner at the periphery of the active fluid pumping unit (101); one reverse pumping return unit (201) having the fluid inlet port (202) and/or fluid outlet port (204) in a downward introducing structure relative to the fluid inlet and/or the fluid outlet port of the active fluid pumping unit (101) is adopted for illustration, what shall be addressed is that installing more than one reverse pumping return unit (201) share the similar technical feature therefore no further illustration is provided;

FIG. 22 is a schematic structural view illustrating the fluid inlet port (202) and/or the fluid outlet port (204) of the reverse pumping return unit (201) being arranged in a downward introducing structure relative to the fluid inlet and/or the fluid outlet port of the active fluid pumping unit (101) according to one embodiment of the present invention;

FIG. 23 is a side view of FIG. 22;

As shown in FIG. 22 and FIG. 23, mainly consists:

Active fluid pumping unit (101): composed of a retracting pipeline segment, a middle testing segment (103), an expanding pipeline segment and a fluid pump (105) installed at the expanding pipeline segment so as to be jointly installed on a base seat (301); with the pumping pressure provided by the fluid pump (105), the fluid inlet port (102) of the retracting pipeline segment is enabled to suck the fluid, the fluid outlet port (104) of the expanding pipeline segment is served to discharge the fluid to the exterior, and the testing segment (103) is served to be installed with a testing member;

Reverse pumping return unit (201): composed of a fluid inlet port (202) of a fluid collecting pipeline segment for sucking fluid, a middle transporting pipeline segment (203) for transporting fluid, a discharging pipeline segment for discharging fluid and a fluid outlet port (204), the fluid inlet port (202) and/or the fluid outlet port (204) of the reverse pumping return unit (201) are arranged in a downward introducing structure relative to the fluid inlet and/or the fluid outlet port of the active fluid pumping unit (101) and a return fluid pump (205) is installed at the fluid outlet port (204) of the reverse pumping return unit (201) or at a location close to the outlet port, and jointly fastened at the periphery of the tubular body of the active fluid pumping unit (101) and/or fastened on the base seat (301) through a combination structure (302), the fluid discharged from the fluid outlet port (104) of the active fluid pumping unit (101) is enabled to be sucked through the pumping of the return fluid pump (205), and a part thereof is transported to an area close to where the fluid inlet port (102) of the active fluid pumping unit (101) sucking fluid;

Return fluid pump (205): composed of an airflow or liquid fluid pump driven by an electric motor;

Base seat (301): installed on a carrying surface (100) such as a ground or a construction unit for carrying the active fluid pumping unit (101), the reverse pumping return unit (201) and other relevant structural members by which the semi-opened hydrodynamic testing device having reverse pumping return unit is configured;

FIG. 24 is a schematic view illustrating the operational status of FIG. 22 and FIG. 23, wherein arrows shown in FIG. 24 indicating the flowing direction of the fluid.

Figure 25:
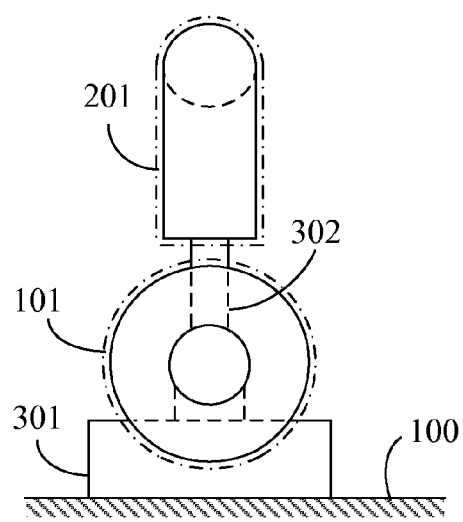
FIG. 25 is a schematic structural view illustrating the discharge direction of the fluid inlet port (202) of the reverse pumping return unit (201) being oriented towards the outward radiating direction with the fluid discharging direction of the active fluid pumping unit (101) being served as the axial core according to one embodiment of the present invention.
Figure 26:
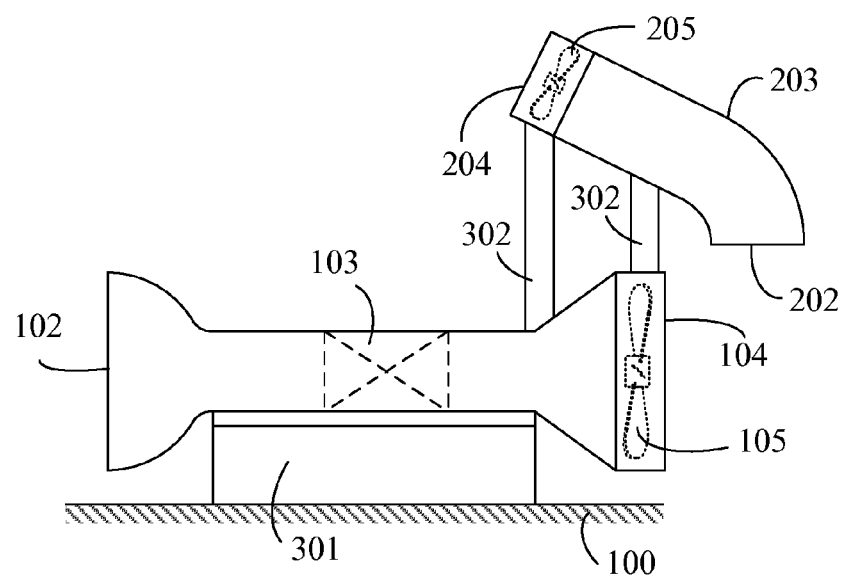
FIG. 26 is a side view of FIG. 25.
Figure 27:
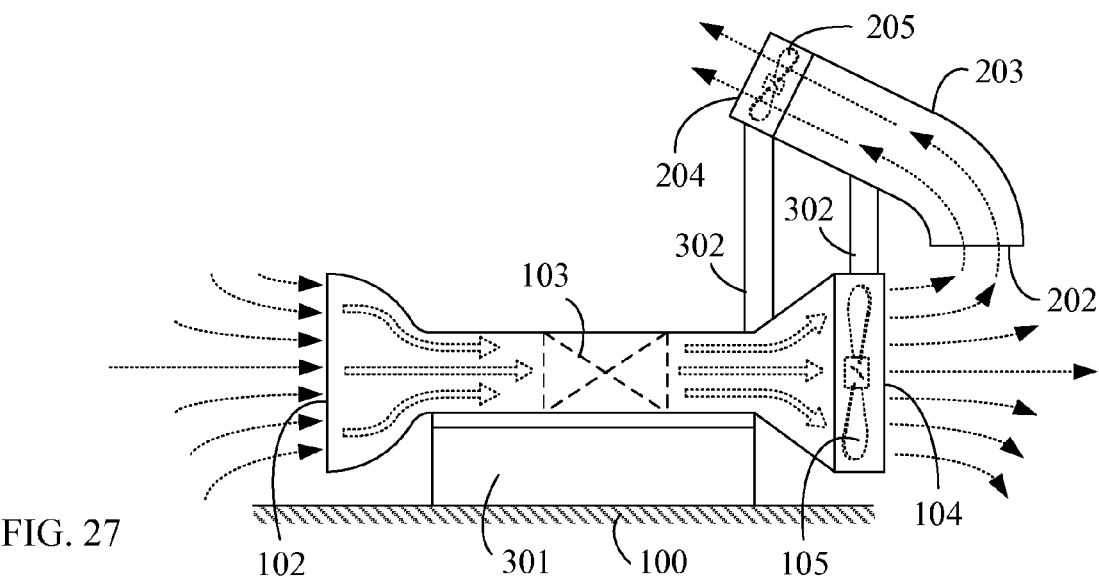
FIG. 27 is a schematic view illustrating the operational status of FIG. 22 and FIG. 23.

According to various applications of the semi-opened hydrodynamic testing device having reverse pumping return unit, the fluid inlet port (202) of the reverse pumping return unit (201) is installed at a space close to the fluid outlet port (104) of the active fluid pumping unit (101), the discharge direction of the fluid outlet port (204) is oriented towards different outward radiating directions with the fluid discharging direction of the active fluid pumping unit (101) being served as the axial core, so with the fluid inlet port (202) of the reverse pumping return unit (201), a part of the fluid discharged from the fluid outlet port (104) of the active fluid pumping unit (101) is enabled to be sucked, thereby reducing the discharging resistance at the fluid outlet port (104) of the active fluid pumping unit (101) and the required discharging stroke space; radially installing one reverse pumping return unit (201) at the periphery of the active fluid pumping unit (101) is provided for illustration, what shall be addressed is that installing more than one reverse pumping return unit (201) share the similar technical feature therefore no further illustration is provided;

FIG. 25 is a schematic structural view illustrating the discharge direction of the fluid inlet port (202) of the reverse pumping return unit (201) being oriented towards the outward radiating direction with the fluid discharging direction of the active fluid pumping unit (101) being served as the axial core according to one embodiment of the present invention;

FIG. 26 is a side view of FIG. 25;

As shown in FIG. 25 and FIG. 26, mainly consists:

Active fluid pumping unit (101): composed of a retracting pipeline segment, a middle testing segment (103), an expanding pipeline segment and a fluid pump (105) installed at the expanding pipeline segment so as to be jointly installed on a base seat (301); with the pumping pressure provided by the fluid pump (105), the fluid inlet port (102) of the retracting pipeline segment is enabled to suck the fluid, the fluid outlet port (104) of the expanding pipeline segment is served to discharge the fluid to the exterior, and the testing segment (103) is served to be installed with a testing member;

Reverse pumping return unit (201): composed of a fluid inlet port (202) of a fluid collecting pipeline segment for sucking fluid, a middle transporting pipeline segment (203) for transporting fluid, a discharging pipeline segment for discharging fluid and a fluid outlet port (204), and a return fluid pump (205) is installed at the fluid outlet port (204) of the reverse pumping return unit (201) or at a location close to the outlet port, and jointly fastened in the outward radiating direction with the fluid discharging direction of the active fluid pumping unit (101) being served as the axial core at the periphery of the tubular body of the active fluid pumping unit (101) and/or fastened on the base seat (301) through a combination structure (302), the fluid discharged from the fluid outlet port (104) of the active fluid pumping unit (101) is enabled to be sucked through the pumping of the return fluid pump (205), and a part thereof is transported in the outward radiating direction with the fluid discharging direction of the active fluid pumping unit (101) being served as the axial core;

Return fluid pump (205): composed of an airflow or liquid fluid pump driven by an electric motor;

Base seat (301): installed on a carrying surface (100) such as a ground or a construction unit for carrying the active fluid pumping unit (101), the reverse pumping return unit (201) and other relevant structural members by which the semi-opened hydrodynamic testing device having reverse pumping return unit is configured;

FIG. 27 is a schematic view illustrating the operational status of FIG. 22 and FIG. 23, wherein arrows shown in FIG. 27 indicating the flowing direction of the fluid.

Figure 28:
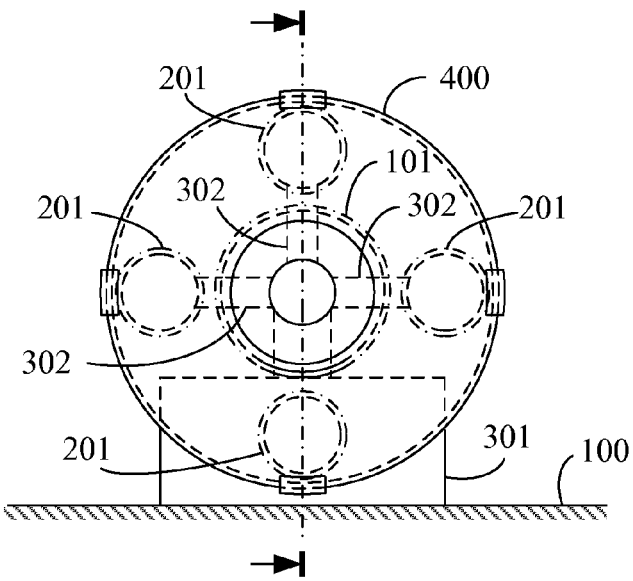
FIG. 28 is a schematic structural view illustrating one active fluid pumping unit (101) and four reverse pumping return units (201) and an annular flow guiding mask (400) being adopted according to one embodiment of the present invention.
Figure 29:
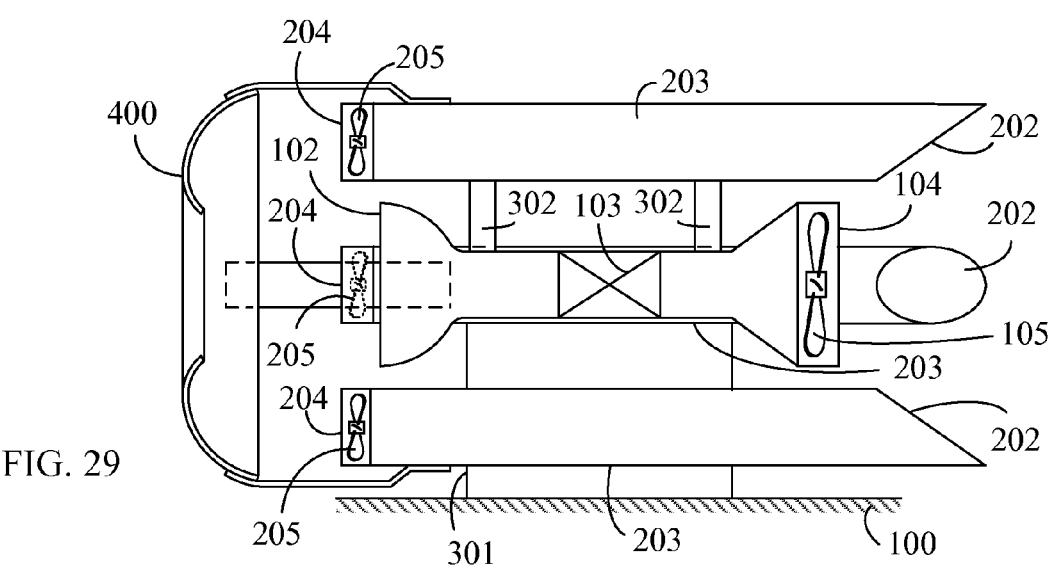
FIG. 29 is a lateral cross sectional view of FIG. 28.
Figure 30:
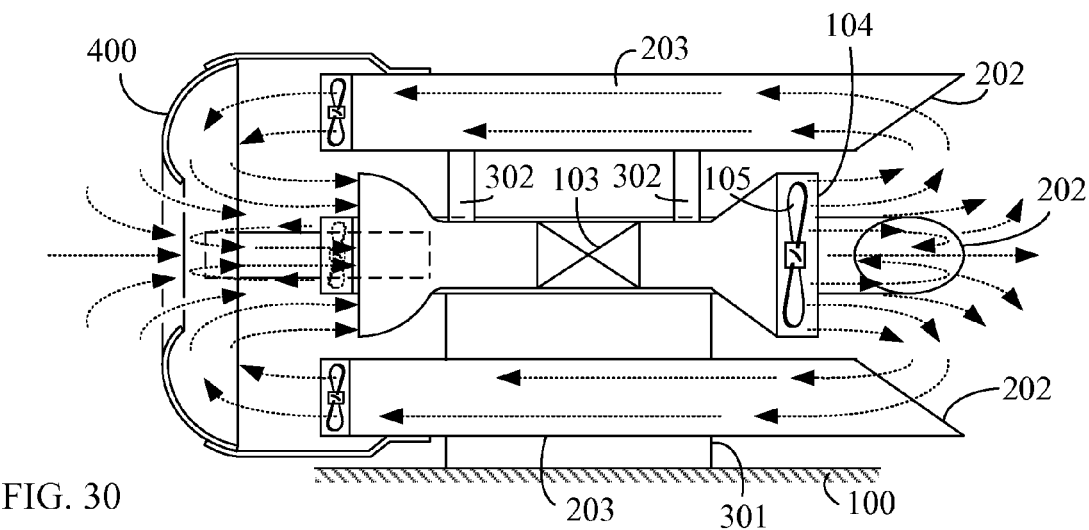
FIG. 30 is a schematic view illustrating the operational status of FIG. 28 and FIG. 29.

According to the semi-opened hydrodynamic testing device having reverse pumping return unit, an annular flow guiding mask (400) used for allowing the fluid discharged from the fluid outlet port (204) to return to the fluid inlet port (102) is further installed at the same side of the fluid inlet port (102) of the active fluid pumping unit (101) and the fluid outlet port (204) of the reverse pumping return unit (201), so a part of the fluid discharged from the fluid outlet port (204) of the reverse pumping return unit (201) is able to be guided to return to the fluid inlet port (102) of the active fluid pumping unit (101), the central hole of the annular flow guiding mask (400) is served to guide in the fluid, an embodiment adopting one active fluid pumping unit (101) and four reverse pumping return units (201) and further adopting the annular flow guiding mask (400) is provided for illustration, what shall be addressed is that other embodiments may share the similar technical feature therefore no further illustration is provided;

FIG. 28 is a schematic structural view illustrating one active fluid pumping unit (101) and four reverse pumping return units (201) and an annular flow guiding mask (400) being adopted according to one embodiment of the present invention;

FIG. 29 is a lateral cross sectional view of FIG. 28;

As shown in FIG. 28 and FIG. 29, mainly consists:

Active fluid pumping unit (101): composed of a retracting pipeline segment, a middle testing segment (103), an expanding pipeline segment and a fluid pump (105) installed at the expanding pipeline segment so as to be jointly installed on a base seat (301); with the pumping pressure provided by the fluid pump (105), the fluid inlet port (102) of the retracting pipeline segment is enabled to suck the fluid from the annular flow guiding mask (400) and the partial ambience, the fluid outlet port (104) of the expanding pipeline segment is served to discharge the fluid to the exterior, and the testing segment (103) is served to be installed with a testing member;

Reverse pumping return unit (201): composed of four parallel or substantially parallel reverse pumping return units (201) installed at the periphery of the active fluid pumping unit (101) in a radial manner, each of the reverse pumping return units (201) includes a fluid inlet port (202) of a fluid collecting pipeline segment for sucking fluid, a middle transporting pipeline segment (203) for transporting fluid, a discharging pipeline segment for discharging fluid and a fluid outlet port (204), and a return fluid pump (205) is respectively installed at the fluid outlet port (204) of the reverse pumping return unit (201) or at a location close to the outlet port, and the four reverse pumping return units (201) are jointly fastened at the periphery of the tubular body of the active fluid pumping unit (101) and/or fastened on the base seat (301) through a combination structure (302), the fluid discharged from the fluid outlet port (104) of the active fluid pumping unit (101) is enabled to be sucked through the pumping of the respectively-installed return fluid pump (205) for being pumped to the fluid receiving surface of the annular flow guiding mask (400), and a part thereof is guided so as to be jointly transported with the fluid passing the central annular hole of the annular flow guiding mask (400) and passing the ambiance of the annular flow guiding mask (400) to the fluid inlet port (102) of the active fluid pumping unit (101);

Return fluid pump (205): composed of an airflow or liquid fluid pump driven by an electric motor;

Base seat (301): installed on a carrying surface (100) such as a ground or a construction unit for carrying the active fluid pumping unit (101), the reverse pumping return unit (201) and other relevant structural members by which the semi-opened hydrodynamic testing device having reverse pumping return unit is configured;

Annular flow guiding mask (400): formed with an annular fluid receiving surface for facing the fluid discharged from the fluid outlet port (204) of the reverse pumping return unit (201), and used for guiding the fluid to return so as to be jointly transported with the fluid passing the annular hole of the annular flow guiding mask (400) to the fluid inlet port (102) of the active fluid pumping unit (101); the shape, the material and the fastening means of the fluid receiving surface of the annular flow guiding mask (400) can be determined according to actual needs;

FIG. 30 is a schematic view illustrating the operational status of FIG. 28 and FIG. 29.

Figure 31:
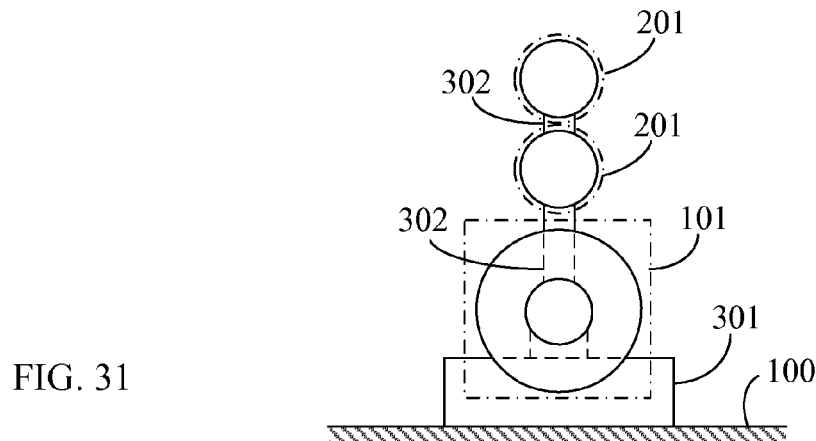
FIG. 31 is a schematic view illustrating two sets of reverse pumping return units (201) being adopted according to one embodiment of the present invention.
Figure 32:
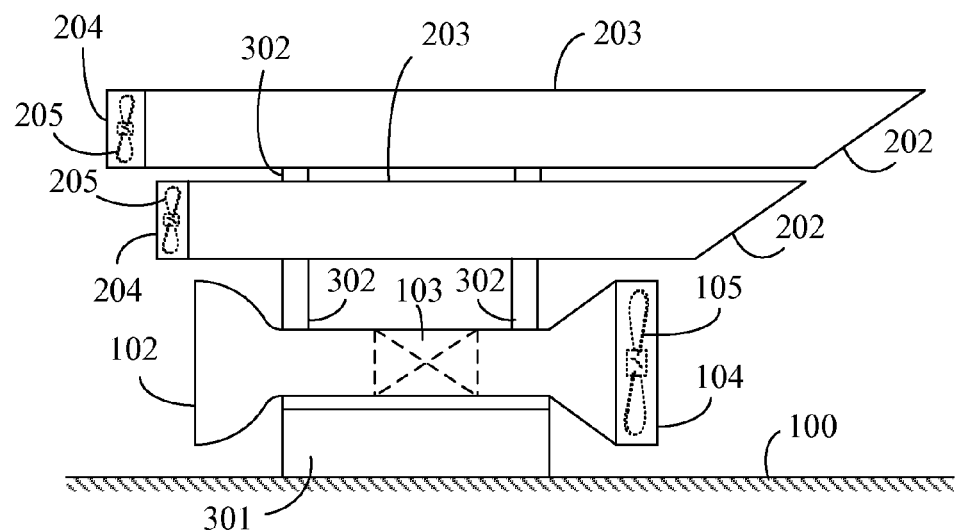
FIG. 32 is a side view of FIG. 31.
Figure 33:
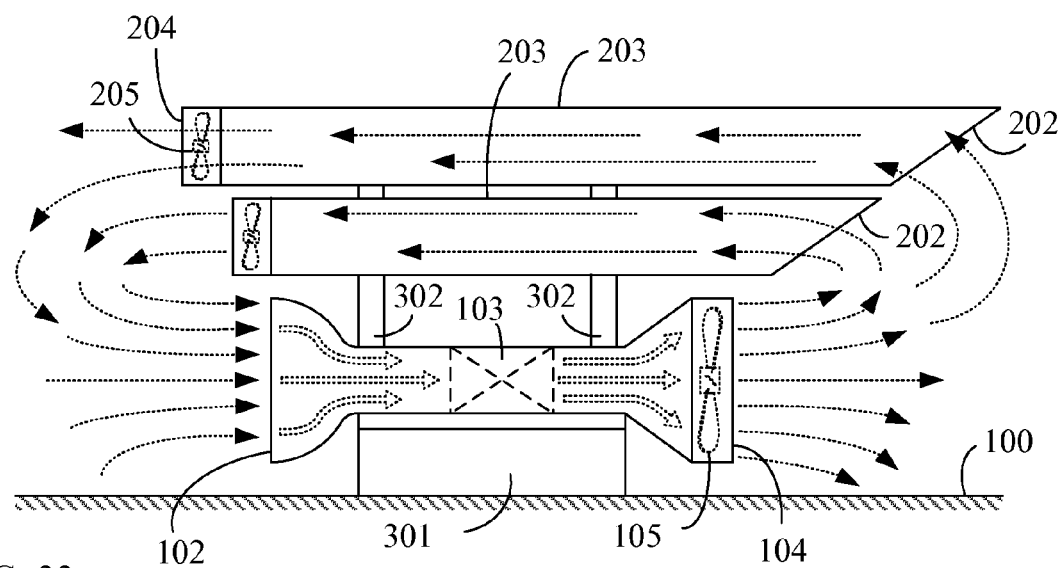
FIG. 33 is a schematic view illustrating the operational status of FIG. 31 and FIG. 32.

According to the semi-opened hydrodynamic testing device having reverse pumping return unit, the one or more than one of the reverse pumping return units (201) installed with a parallel or substantially parallel manner at the periphery of the active fluid pumping unit (101) can be further arranged with a two set or multiple set means, the reverse pumping return unit (201) disclosed in the embodiment shown in FIG. 1 is adopted as an example for being arranged with a two set means, plural reverse pumping return units (201) for forming a multiple-set reverse pumping return unit (201) shares the similar technical feature therefore no further illustration is provided;

FIG. 31 is a schematic view illustrating two sets of reverse pumping return units (201) being adopted according to one embodiment of the present invention;

FIG. 32 is a side view of FIG. 31;

According to the semi-opened hydrodynamic testing device having reverse pumping return unit, two or multiple sets of the reverse pumping return units (201) are installed with a parallel or substantially parallel manner at the periphery of the active fluid pumping unit (101), which mainly consists:

Active fluid pumping unit (101): composed of a retracting pipeline segment, a middle testing segment (103), an expanding pipeline segment and a fluid pump (105) installed at the expanding pipeline segment so as to be jointly installed on a base seat (301); with the pumping pressure provided by the fluid pump (105), the fluid inlet port (102) of the retracting pipeline segment is enabled to suck the fluid, the fluid outlet port (104) of the expanding pipeline segment is served to discharge the fluid to the exterior, and the testing segment (103) is served to be installed with a testing member;

Reverse pumping return unit (201): composed of a fluid inlet port (202) of a fluid collecting pipeline segment for sucking fluid, a middle transporting pipeline segment (203) for transporting fluid, a discharging pipeline segment for discharging fluid and a fluid outlet port (204), and a return fluid pump (205) is installed at the fluid outlet port (204) of the reverse pumping return unit (201) or at a location close to the outlet port, and two or more than two of the reverse pumping return units (201) arranged with a two or multiple set format are installed with a parallel or substantially parallel manner at the periphery of the active fluid pumping unit (101), and jointly fastened at the periphery of the tubular body of the active fluid pumping unit (101) and/or fastened on the base seat (301) through a combination structure (302), the fluid discharged from the fluid outlet port (104) of the active fluid pumping unit (101) is enabled to be sucked through the pumping of the respectively-installed return fluid pump (205), and a part thereof is transported to an area close to where the fluid inlet port (102) of the active fluid pumping unit (101) sucking fluid;

Return fluid pump (205): composed of an airflow or liquid fluid pump driven by an electric motor;

Base seat (301): installed on a carrying surface (100) such as a ground or a construction unit for carrying the active fluid pumping unit (101), the reverse pumping return unit (201) and other relevant structural members by which the semi-opened hydrodynamic testing device having reverse pumping return unit is configured;

FIG. 33 is a schematic view illustrating the operational status of FIG. 31 and FIG. 32.

Figure 34:
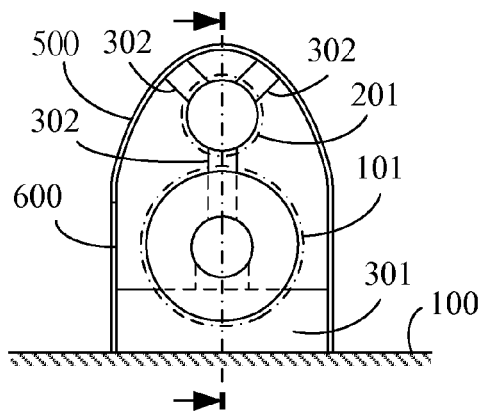
FIG. 34 is a schematic view illustrating an external flow guiding cover (500) being installed according to one embodiment of the present invention.
Figure 35:
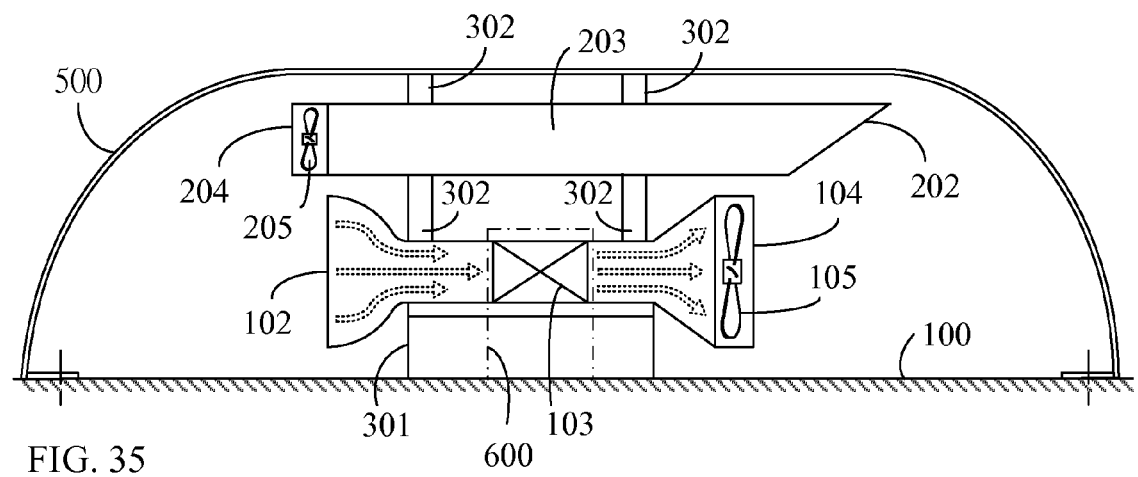
FIG. 35 is a lateral cross sectional view of FIG. 34.
Figure 36:
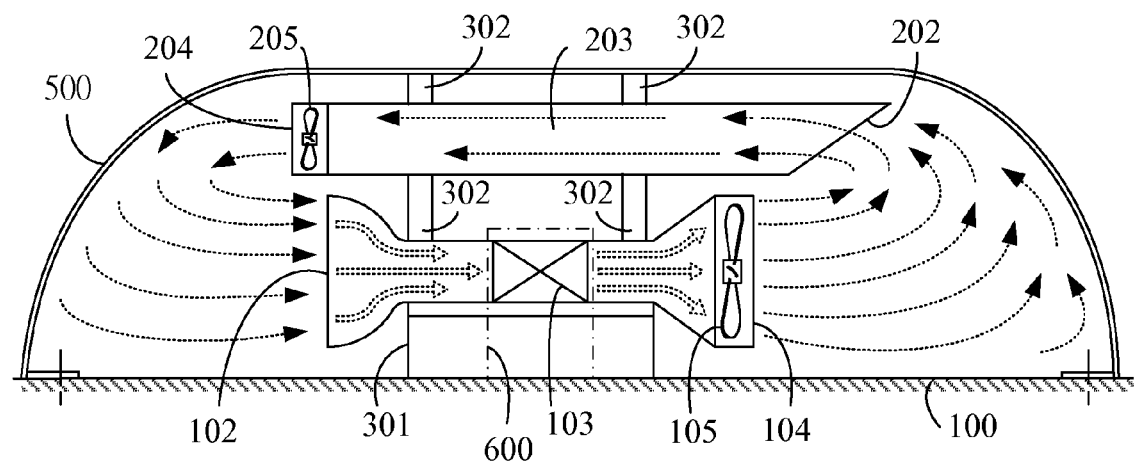
FIG. 36 is a schematic view illustrating the operational status of FIG. 34 and FIG. 35.

According to the semi-opened hydrodynamic testing device having reverse pumping return unit, a flow guiding cover (500) can be further installed between the semi-opened hydrodynamic testing device, constituted by the active fluid pumping unit (101), the reverse pumping return unit (201) and the base seat (301), and the carrying surface for enhancing the performance of the fluid returning to the fluid inlet port (102) from the fluid outlet port (104); the embodiment shown in FIG. 1 being installed with the flow guiding cover (500) is served for illustration, other illustrations for the embodiments adopting plural reverse pumping return units (201) or multiple sets of reverse pumping return units (201) are not further provided;

FIG. 34 is a schematic view illustrating an external flow guiding cover (500) being installed according to one embodiment of the present invention;

FIG. 35 is a lateral cross sectional view of FIG. 34;

According to the semi-opened hydrodynamic testing device having reverse pumping return unit, one or more than one of the reverse pumping return units (201) are installed with a parallel or substantially parallel manner at the periphery of the active fluid pumping unit (101), which mainly consists:

Active fluid pumping unit (101): composed of a retracting pipeline segment, a middle testing segment (103), an expanding pipeline segment and a fluid pump (105) installed at the expanding pipeline segment so as to be jointly installed on a base seat (301); with the pumping pressure provided by the fluid pump (105), the fluid inlet port (102) of the retracting pipeline segment is enabled to suck the fluid, the fluid outlet port (104) of the expanding pipeline segment is served to discharge the fluid to the exterior, and the testing segment (103) is served to be installed with a testing member;

Reverse pumping return unit (201): composed of a fluid inlet port (202) of a fluid collecting pipeline segment for sucking fluid, a middle transporting pipeline segment (203) for transporting fluid, a discharging pipeline segment for discharging fluid and a fluid outlet port (204), and a return fluid pump (205) is installed at the fluid outlet port (204) of the reverse pumping return unit (201) or at a location close to the outlet port, and jointly fastened at the periphery of the tubular body of the active fluid pumping unit (101) and/or fastened on the base seat (301) through a combination structure (302), the fluid discharged from the fluid outlet port (104) of the active fluid pumping unit (101) is enabled to be sucked through the pumping of the return fluid pump (205), and a part thereof is transported to an area close to where the fluid inlet port (102) of the active fluid pumping unit (101) sucking fluid;

Return fluid pump (205): composed of an airflow or liquid fluid pump driven by an electric motor;

Base seat (301): installed on a carrying surface (100) such as a ground or a construction unit for carrying the active fluid pumping unit (101), the reverse pumping return unit (201) and other relevant structural members by which the semi-opened hydrodynamic testing device having reverse pumping return unit is configured;

Flow guiding cover (500): a structural body formed in a reversed-bowl shape and made of a solid state material or a construction material, and provided with an in/out door (600); the space defined between the internal concave space and the carrying surface where the flow guiding cover (500) being installed thereon is served to guide the fluid discharged from the fluid outlet port (104) of the active fluid pumping unit (101) and the fluid sucked from the fluid inlet port (202) of the reverse pumping return unit (201) to the fluid inlet port (102) of the active fluid pumping unit (101);

FIG. 36 is a schematic view illustrating the operational status of FIG. 34 and FIG. 35.

According to the semi-opened hydrodynamic testing device having reverse pumping return unit, the reverse pumping return unit (201) not only can be combined to the tubular body of the active fluid pumping unit (101) and/or the base seat (301) through the combination structure (302), but the reverse pumping return unit (201) can also be individually installed.

According to the semi-opened hydrodynamic testing device having reverse pumping return unit, a holding device for locating the measuring instrument or the testing member, and an electric controller for controlling the fluid pump (105) and the return fluid pump (205) can be further installed.

According to the semi-opened hydrodynamic testing device having reverse pumping return unit, the shape of the fluid inlet port (102) and the fluid outlet port (104) of the active fluid pumping unit (101) and the shape of the fluid inlet port (202) and the fluid outlet port (204) of the reverse pumping return unit (201) can be determined for being formed in certain geometric shape with respect to the actual needs.

The semi-opened hydrodynamic testing device having reverse pumping return unit includes being applied in an airflow or liquid semi-opened hydrodynamic testing device.

According to the semi-opened hydrodynamic testing device having reverse pumping return unit, the fluid pump (105) and the return fluid pump (205) include the positive pressure fluid pump or the negative pressure fluid pump constituted by an airflow or liquid fluid pump.

According to the semi-opened hydrodynamic testing device having reverse pumping return unit, the fluid inlet port (102) of the active fluid pumping unit (101) is further installed with a positive pressure fluid pump for replacing the negative pressure fluid pump installed at the fluid outlet port (104).

According to the semi-opened hydrodynamic testing device having reverse pumping return unit, the fluid inlet port (102) of the active fluid pumping unit (101) is further installed with a positive pressure fluid pump, and the fluid outlet port (104) is further installed with a negative pressure fluid pump for performing the pumping operation at the same time or only one of the two performing the pumping operation.

According to the semi-opened hydrodynamic testing device having reverse pumping return unit, the fluid inlet port (202) of the reverse pumping return unit (201) is further installed with a positive pressure fluid pump for replacing the negative pressure fluid pump installed at the fluid outlet port (204).

According to the semi-opened hydrodynamic testing device having reverse pumping return unit, the fluid inlet port (202) of the reverse pumping return unit (201) is further installed with a positive pressure fluid pump, and the fluid outlet port (204) is further installed with a negative pressure fluid pump for performing the pumping operation at the same time or only one of the two performing the pumping operation.

The invention claimed is:

1. A semi-opened hydrodynamic testing device having a pressure pumping return unit, comprising; an active fluid pumping unit (101) installed on a base seat (301) and formed by a first pipeline having a retracting pipeline segment, a middle testing pipeline segment (103), and an expanding pipeline segment, wherein: the retracting pipeline segment has a first fluid inlet port (102) and an outlet, and the outlet of the retracting pipeline segment has a cross-sectional area that is smaller than a cross-sectional area of the first fluid net port (102); the middle testing pipeline segment (10) is installed with a measuring instrument or testing member and has an inlet end connected to the outlet of the retracting pipeline segment; the expanding pipeline segment has an inlet and a first fluid outlet port (104) at an outlet side of the expanding pipeline segment, and the net of the expanding pipeline segment has a smaller cross-sectional area than the first fluid outlet port (104); and an active fluid pump (105) installed in the active fluid pumping unit (101) for drawing fluid into the first fluid net port (102); through the retracting pipeline segment; through the middle testing segment, and through the expanding pipeline segment for discharge through the first fluid outlet port (104); a reverse pumping return unit (201) formed by a second pipeline having a fluid collecting pipeline segment, a middle transporting pipeline segment (203), and a discharging pipeline segment, wherein: the fluid collecting pipeline segment has a second fluid net port (202) at an input end for sucking a portion of the fluid discharged through the first fluid output port (104); the middle transporting pipeline segment (203) is connected to the fluid collecting pipeline segment; the discharging pipeline segment is connected to the middle transporting pipeline segment (203) and extending to a second fluid outlet port (204); and a return fluid pump (205) is installed in the reverse pumping return unit (201) for drawing said first portion of the fluid discharged from the first fluid outlet port (104) into the second fluid net port (202), through the fluid collecting pipeline segment, through the middle transporting pipeline segment (203), and through the discharging pipeline segment for discharge through the second fluid outlet port (204); and a flow guiding cover (500) extending over the base seat (301), the reverse pumping return unit (201), and the active fluid pumping unit (101); said flow guiding cover (500) defining an internal convex shape to guide the fluid from the first fluid output port (104) to the second fluid net port (202) and from the second fluid outlet port (204) to the first fluid net port (102), whereby the circulation of the portion of the fluid discharged from the first fluid outlet port (104) into the reverse pumping return unit (201) reduces fluid resistance of the first fluid outlet port (104) and reduces a required discharging stroke space.

2. The semi-opened hydrodynamic testing device as claimed in claim 1, wherein the active fluid pumping unit (101) and the reverse pumping return unit (201) have tubular shapes.

3. The semi-opened hydrodynamic testing device as claimed in claim 1, further comprising a second said reverse pumping return unit (201) parallel to the first reverse pumping return unit (201) and fastened to at least one of a periphery of the active fluid pumping unit (101) and the base seat (301) by a joining structure (302).

4. The semi-opened hydrodynamic testing device as claimed in claim 3, wherein axes of the two reverse pumping return units (201) form an inverted triangle with the base seat (301).

5. The semi-opened hydrodynamic testing device as claimed in claim 3, wherein one of the two reverse pumping return units (201) is installed at a top side of the active fluid pumping unit (101) and a second of the two reverse pumping return units (201) is installed at a lateral side of the active fluid pumping unit (101).

6. The semi-opened hydrodynamic testing device as claimed in claim 3, wherein the two reverse pumping return units (201) are installed at opposite lateral sides of the active fluid pumping unit (101).

7. The semi-opened hydrodynamic testing device as claimed in claim 6, further comprising a third reverse pumping return unit (201) installed at a top side of the active fluid pumping unit (101).

8. The semi-opened hydrodynamic testing device as claimed in claim 3, further comprising a third said reverse pumping return unit (201) parallel to the first and second reverse pumping return units (201), wherein the third reverse pumping return unit (201) is installed in and extends through the base seat (301), and wherein the first and second reverse pumping return units (201) are installed at sides of the active fluid pumping unit (101), such that axes of the three reverse pumping return units (201) form an inverted triangle.

9. The semi-opened hydrodynamic testing device as claimed in claim 3, further comprising third and fourth said reverse pumping return units (201) parallel to the first and second reverse pumping return units (201), wherein the third reverse pumping return unit (201) is installed in and extends through the base seat (301), wherein the first and second reverse pumping return units (201) are installed at opposite lateral sides of the active fluid pumping unit (101), and wherein the fourth reverse pumping return unit (201) is installed at a top side of the active fluid pumping unit (101).

10. The semi-opened hydrodynamic testing device as claimed in claim 9, further comprising an annular flow guiding mask (400) for guiding the fluid from each of the second fluid outlet ports (204) to the first fluid net port (102), said annular flow guiding mask (400) including a central opening through which ambient air is also drawn to the first fluid inlet port (102).

11. The semi-opened hydrodynamic testing device as claimed in claim 1, wherein at least one of the second fluid inlet port (202) and the second fluid outlet port (204) extends downwardly towards a corresponding one of the first fluid outlet port (104) and the first fluid inlet port (102).

12. The semi-opened hydrodynamic testing device as claimed in claim 1, wherein the reverse pumping return unit (201) extends parallel to the active fluid pumping unit (101) and the second fluid outlet port (204) is at a location proximate the first fluid net port (102) such that a portion of the fluid discharged through the second fluid outlet port (204) is drawn by the active fluid pump (105) into the first fluid net port (102).

13. The semi-opened hydrodynamic testing device as claimed in claim 1, wherein the reverse pumping return unit (201) is oriented at a non-zero angle relative to the active fluid pumping unit (101) and the second fluid outlet port (204) is situated away from the first fluid net port (102).

14. The semi-opened hydrodynamic testing device as claimed in claim 1, wherein at least one of the active fluid pump (105) and the return fluid pump (205) is driven by an electric motor.

15. The semi-opened hydrodynamic testing device as claimed in claim 1, wherein the active fluid pump (105) and the return fluid pump (205) are airflow pumps.

16. The semi-opened hydrodynamic testing device as claimed in claim 1, wherein the active fluid pump (105) and the return fluid pump (205) are liquid pumps.

17. The semi-opened hydrodynamic testing device as claimed in claim 1, further comprising at least one additional said reverse pumping return unit (201) installed in parallel to and above the first said reverse pumping return unit (201), wherein a portion of the fluid discharged from the first fluid outlet port (104) is drawn into the second fluid net port (202) of the at least one additional reverse pumping return unit (201), and a portion of the fluid discharged from the second fluid outlet port (204) of the at least one additional reverse pumping return unit (201) is returned to the first fluid net port (102).

18. The semi-opened hydrodynamic testing device as claimed in claim 1, wherein the reverse pumping return unit (201) is fastened to at least one of a periphery of the active fluid pumping unit (101) and the base seat (301).

19. The semi-opened hydrodynamic testing device as claimed in claim 1, further comprising a holding device for placing the measuring instrument or testing member in the middle testing segment (103).

20. The semi-opened hydrodynamic testing device as claimed in claim 1, wherein the active fluid pump (105) is a negative pressure fluid pump installed at the first fluid outlet port (104).

21. The semi-opened hydrodynamic testing device as claimed in claim 1, wherein the return fluid pump (205) is a negative pressure fluid pump installed at the second fluid outlet port (204) to provide said negative pressure that draws the fluid into the second fluid inlet port (202).

* * * * *